US 6,532,022 B1

(12) United States Patent
Ahmad

(10) Patent No.: US 6,532,022 B1
(45) Date of Patent: Mar. 11, 2003

(54) METHOD AND APPARATUS FOR MODEL-BASED COMPOSITING

(75) Inventor: Subutai Ahmad, Palo Alto, CA (US)

(73) Assignee: Electric Planet, Inc., Palo Alto, CA (US)

( * ) Notice: Subject to any disclaimer, the term of this patent is extended or adjusted under 35 U.S.C. 154(b) by 0 days.

(21) Appl. No.: 08/951,089

(22) Filed: Oct. 15, 1997

(51) Int. Cl.[7] .............. G06T 11/80; G06K 9/36
(52) U.S. Cl. ...................... 345/629; 382/283
(58) Field of Search ............. 345/629; 382/282, 382/284, 164, 167, 272, 283, 291; 358/464, 453, 450

(56) References Cited

U.S. PATENT DOCUMENTS

| | | | |
|---|---|---|---|
| 4,641,349 A | 2/1987 | Flom et al. ................. 382/2 |
| 4,843,568 A | 6/1989 | Krueger et al. ............. 364/518 |
| 5,148,477 A | 9/1992 | Neely et al. ................. 382/6 |
| 5,278,921 A * | 1/1994 | Nakamura et al. ........... 382/167 |
| 5,321,764 A * | 6/1994 | Cullen et al. ............... 382/110 |
| 5,343,252 A * | 8/1994 | Dadourian .................. 348/586 |
| 5,384,912 A | 1/1995 | Ogrinc et al. ............... 395/164 |
| 5,454,043 A | 9/1995 | Freeman .................... 382/168 |
| 5,469,536 A | 11/1995 | Blank ....................... 395/131 |
| 5,548,659 A | 8/1996 | Okamoto .................... 382/107 |
| 5,570,113 A | 10/1996 | Zetts ........................ 345/173 |
| 5,577,179 A | 11/1996 | Blank ....................... 395/135 |
| 5,581,276 A | 12/1996 | Cipolla et al. .............. 345/156 |
| 5,623,587 A | 4/1997 | Bulman |
| 5,631,697 A | 5/1997 | Nishimura et al. |
| 5,767,867 A | 6/1998 | Hu |
| 5,781,198 A | 7/1998 | Korn |
| 5,790,124 A | 8/1998 | Fischer et al. |
| 6,011,595 A * | 1/2000 | Henderson et al. .......... 348/590 |

OTHER PUBLICATIONS

Chung–Lin Huang and Ming–Shan Wu, A Model–based Complex Background Gesture Recognition System, IEEE, 1996, vol. 1, pp. 93–98, abstract.

3DK: The Virtual Studio; Blending real and virtual spaces; Research area: Intelligent Multimedia Systems; GDM, Nov. 24, 1994.

* cited by examiner

Primary Examiner—Thu Nguyen
(74) Attorney, Agent, or Firm—Van Pelt & Yi LLP

(57) ABSTRACT

An object is composited digitally from an input image onto a destination image. A background model is created and a frame of an input image containing the object is obtained. An alpha image is created in which each pixel is either a zero, indicating it is not part of the object, or a one, indicating that it is part of the object. The effect of shadows emanating from the object is reduced. A set of templates is then derived to allow holes or gaps in the object created during the compositing process to be filled to a large extent. The object is blended onto a destination image using the alpha image as a blending coefficient.

42 Claims, 20 Drawing Sheets

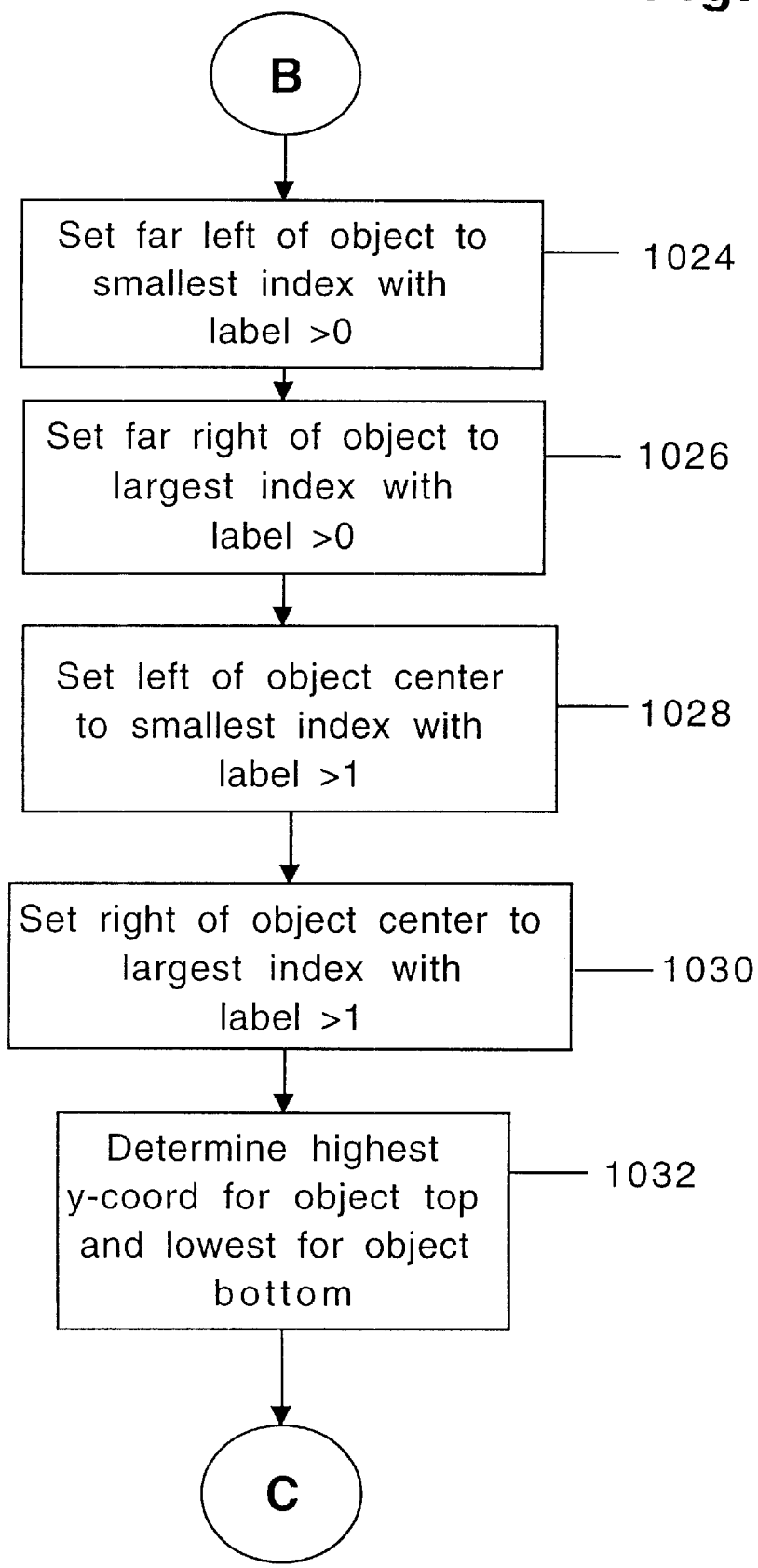

METHOD AND APPARATUS FOR MODEL-BASED COMPOSITING

CROSS REFERENCE TO RELATED APPLICATION

This application is related to co-pending U.S. patent application Ser. No. 60/062,068, filed herewith, is incorporated herein by reference for all purposes.

BACKGROUND OF THE INVENTION

1. Field of Invention

The present invention relates generally to methods and apparatus for compositing objects from an input image to a destination image. More particularly, the present invention relates to reducing extraneous clutter and holes from the object being composited and, in addition, reducing the effect of shadows emanating from the composited object in the destination image.

2. Background

An important procedure in the field of film and video editing is taking an object in one image, e.g. an input image, and compositing that object onto another image, e.g. a destination image, with minimal distortion of the object. For example, this procedure could be used for taking an object such as a human figure in one video and placing that human figure into another video without distorting or altering the image of the person. One video image may have a person standing or moving around in a typical living room and another video can be of an outdoor scene such as a jungle or desert. The compositing procedure would take the image of the human figure in the living room and place the figure in the other video thereby providing the effect of the human figure standing or moving around in the given outdoor setting.

One well-known and widely used prior art method for compositing objects from a input image to a destination image is from the field of digital effects and chroma-keying. This method is commonly referred to as blue-screening and involves placing a blue or other fixed-color screen behind the object being composited, typically the image of a person (the color blue is a hue that strongly contrasts all colors of human skin). In blue-screening, the system checks to see which pixels in the input image are not blue and labels those pixels as foreground pixels. Normally, the foreground pixels will only be those pixels that are part of the object being composited since there are typically no other objects in the image and the background is solid blue. The system then composites, or blends, the object (i.e. collection of all foreground pixels) onto a destination image. One of the disadvantages of using blue-screening for object compositing is that it requires a fixed color screen behind the object. Another disadvantage is that if any of the colors on the object, such as an item of clothing, is blue, holes will appear in the object in the destination image. This occurs because the pixels in the blue areas on the object will not be labeled as foreground pixels and thus will not be composited with the rest of the object, resulting in the object having holes when composited onto the destination image.

Other prior art background subtraction procedures, from the field of computer vision, are used to eliminate the fixed color screen requirement. One procedure involves building an average background image by taking a predetermined number of sample images of a (multi-colored) background and creating a background model. For each new sample image taken, each pixel in the new image is compared to its corresponding pixel in the background model being formed. This is done to determine whether the pixel in the current sample image is a foreground pixel, i.e. an object pixel. Pixels that are determined to be part of the foreground are then blended or composited onto the destination image. One disadvantage with this procedure is if a foreground pixel happens to match its corresponding background model pixel color, it will not be considered a foreground pixel. This will introduce holes into the composited object. Another disadvantage is that shadows cast by the object often make the object, when composited, appear to have its original form plus extraneous appendages (as a result of the shadows). The procedure mistakenly labels the "shadow" pixels as foreground pixels. Yet another disadvantage is if any portion of the background changes or if the camera is moved while the background model is being built, certain portions of the background (e.g. the portions that moved) will be incorrectly labeled as part of the foreground and be composited onto the destination image. Although there are prior art techniques for updating the background model to reflect changes, they cannot account for a constantly changing background such as one that includes a changing television screen or a window looking out onto a busy street.

Another prior art method of compositing objects, taken from the field of computer vision and z-keying, involves the use of stereo cameras. The method involves calculating, or extracting, a depth value for each pixel. Pixels that are closer than a certain depth from the camera are labeled as foreground pixels and eventually composited onto a destination image. The image processing algorithms involved in computing the depth values in real time require immense computation making them impractical to implement on typical home personal computers. In addition, the procedure requires the use of two cameras.

An important sub-function of the broader procedure of compositing objects from an input image to a destination image is reducing the effect of shadows emanating from the object in the input image in the compositing procedure. For example, if the object is a person standing in a room in which the lighting causes the person to cast shadows on the floors or walls around him, the goal is to reduce the effect of the shadow in the destination image (i.e., the shadow should not appear as part of the person in the destination image). The procedure should determine which pixels belong to the actual object and which pixels make up a shadow.

One prior art method of reducing the effect of shadows in the destination image, referred to as intensity-based shadow filtering, involves building an average model of the background image. Once this average background image is entered, the system knows the approximate brightness of each pixel in the background. Thus, if a pixel becomes somewhat darker in the input image, the system assumes that the pixel is now within a shadow. However, if the pixel in the average background image is now "covered" by the object being composited and also happens to be darker than the "covered" pixel, the same method will create a hole in the object once composited onto the destination image (the size of the hole depending on the number of pixels that are darker and are part of the object). Thus, the problem with the prior art method of reducing the undesirable effect of shadows in the destination image is that the shadow removal process itself may create more holes in the body of the object being composited.

Therefore, it would be desirable to have a method and apparatus for compositing objects from an input image to a destination image such that the object is composited with the least amount of distortion from shadows or a constantly changing background, and has a reduced number of holes and gaps after compositing onto the destination image.

SUMMARY OF THE INVENTION

The present invention provides an object compositing system for compositing an object from an input image onto a destination image. In a preferred embodiment, the object is composited from an image having an arbitrary or non-uniform colored background containing some non-static elements onto a destination image with minimum effects from shadows cast by the object and with minimum gaps or holes within the object. Various improvements in the compositing procedure such as shadow reduction and hole filling, and less restrictive requirements regarding the object's surroundings are described herein.

In a preferred embodiment, an object compositing method of extracting an object from an image model and blending the object onto a destination image is described. A background model is created by examining several frames of an average background image before the object being composited enters the image. A frame of the input image containing the object is obtained after the background image model has been created. An alpha image is created in which each pixel ranges from "0" indicating it is not part of the object to "1" indicating that it is part of the object. The alpha pixel values are set according to values corresponding to input image pixels and average background pixels. The effect of shadows emanating from the object is reduced so that the composited object in the destination image contains only the object clearly outlined by the object's physical boundaries without the effect of shadows cast by the object. This is done by comparing the brightness of the input image pixels to the brightness of the average background image pixels. It is then determined whether the input image pixel hue (color) is within a predetermined hue tolerance of a corresponding pixel from the average background image. The type and extent of the pattern surrounding the input image pixel is then calculated and compared to the pattern surrounding its corresponding pixel from the average background image. A set of templates is then derived in which the templates fit within the object. The templates allow holes or gaps in the object created during the compositing process to be filled to a large extent. The templates can be configured to comprise the shape of the object. All alpha pixels of the object falling within any of the templates are switched or kept at a value of "1", ensuring that the pixels are part of the object. The object is blended onto the destination image using the alpha image as a blending coefficient (alpha blend) wherein all input image pixels corresponding to alpha pixels with value one are blended onto the destination image.

In another preferred embodiment the compositing procedure bypasses the shadow reduction routine thereby allowing the object to be composited faster in situations where shadows cast by the object are not likely to effect the outline of the object once composited. In yet another preferred embodiment the compositing procedure bypasses the template creation and fitting routine thereby allowing the object to be composited faster in situations where the object may not be easily amenable to being fitted by a configuration of templates or it is not likely that the object will contain holes or gaps once composited as a result of colors on the object and in the background, for example.

In another aspect of the present invention, a method of reducing the effect of shadows in the input image is described. An input image pixel and a corresponding average background image pixel is retrieved and the brightness of both pixels are compared. It is then determined whether the hue of the input image pixel is within a hue tolerance of the average background image pixel. Another input image pixel close to the first pixel and another average background image pixel close to the first background pixel are retrieved. It is then determined what type of pattern surrounds the first input image pixel and what type of pattern surrounds the first average background pixel by using the second pixels retrieved from the respective images. A pixel rank scheme is then used to compare the two pattern types to determine whether the first input image pixel is part of a shadow. An alpha image pixel corresponding to the first input image pixel is then set accordingly.

In another aspect of the present invention a method of creating a set of templates in which each template fits within the object is described. A histogram is initialized and an alpha pixel from an alpha image is retrieved and its value determined. Each column in the histogram, represented by an index, corresponds to a column of pixels in the alpha image. The values of the histogram indexes are incremented based on the number of alpha pixels with value one falling in a particular index until there are no more alpha image pixels. An index and a value of the index are retrieved, until there are no more indexes in the histogram, and the index is assigned a label based on the index value. Indexes and y-coordinate values are then set to indicate the position of the left, right, top, and bottom boundaries of the object using the alpha image. Indexes are also set to indicate the position of the right and left boundaries of the object's center (i.e., left of center and right of center boundaries). These indexes and y-coordinate values are then used to compute bounding rectangles for the object. The bounding rectangles are then used to derived a set of templates where each template fits within its corresponding object part.

The advantages of the methods and systems described and claimed are cleaner, well-defined, and complete objects shown on the destination image after being composited. In addition, an object, whether animate or inanimate, is composited from an image with dynamic or changing background

BRIEF DESCRIPTION OF THE DRAWINGS

The invention, together with further advantages thereof, may best be understood by reference of the following description taken in conjunction with the accompanying drawings in which:

FIGS. 10A through 10D are flowcharts showing a process for matching the object to a model of the object made up of object part templates.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

The present invention employs various processes involving data stored in computer systems. These processes are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms such as identifying, running, comparing, or detecting. In any of the operations described herein that form part of the present invention, these operations are machine operations. Useful machines for performing the operations of the present invention include general purpose digital computers or other similar devices. In all cases, it should be borne in mind the distinction between the method of operations in operating a computer and the method of computation itself. The present invention relates to method blocks for operating a computer in processing electrical or other physical signals to generate other desired physical signals.

The present invention also relates to a computer system for performing these operations. This computer system may be specially constructed for the required purposes, or it may be a general purpose computer selectively activated or reconfigured by a computer program stored in the computer. The processes presented herein are not inherently related to any particular computer or other computing apparatus. In particular, various general purpose computing machines may be used with programs written in accordance with the teachings herein, or it may be more convenient to construct a more specialized computer apparatus to perform the required method blocks.

Figure 1:
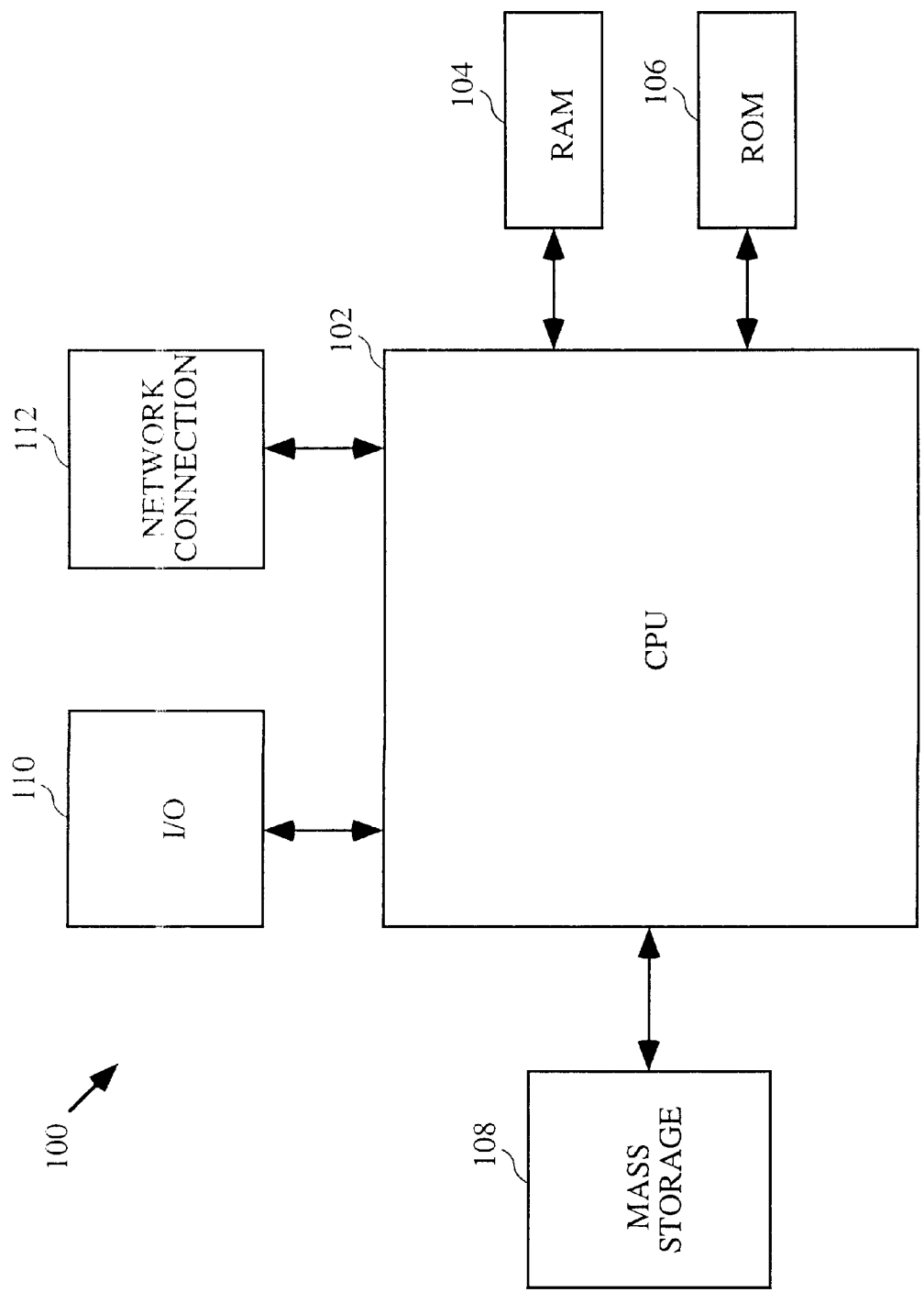
FIG. 1 is a schematic illustration of a general purpose computer system suitable for implementing the present invention.

FIG. 1 is a schematic illustration of a general purpose computer system suitable for implementing the process of the present invention. The computer system includes a central processing unit (CPU) 102, which CPU is coupled bi-directionally with random access memory (RAM) 104 and unidirectionally with read only memory (ROM) 106. Typically RAM 104 includes programming instructions and data, including text objects as described herein in addition to other data and instructions for processes currently operating on CPU 102. ROM 106 typically includes basic operating instructions, data and objects used by the computer to perform its functions. In addition, a mass storage device 108, such as a hard disk, CD ROM, magneto-optical (floptical) drive, tape drive or the like, is coupled bi-directionally with CPU 102. Mass storage device 108 generally includes additional programming instructions, data and text objects that typically are not in active use by the CPU, although the address space may be accessed by the CPU, e.g., for virtual memory or the like. Each of the above described computers further includes an input/output source 110 that typically includes input media such as a keyboard, pointer devices (e.g., a mouse or stylus) and the like. Each computer can also include a network connection 112 over which data, including, e.g., text objects, and instructions can be transferred. Additional mass storage devices (not shown) may also be connected to CPU 102 through network connection 112. It will be appreciated by those skilled in the art that the above described hardware and software elements are of standard design and construction.

Figure 2:
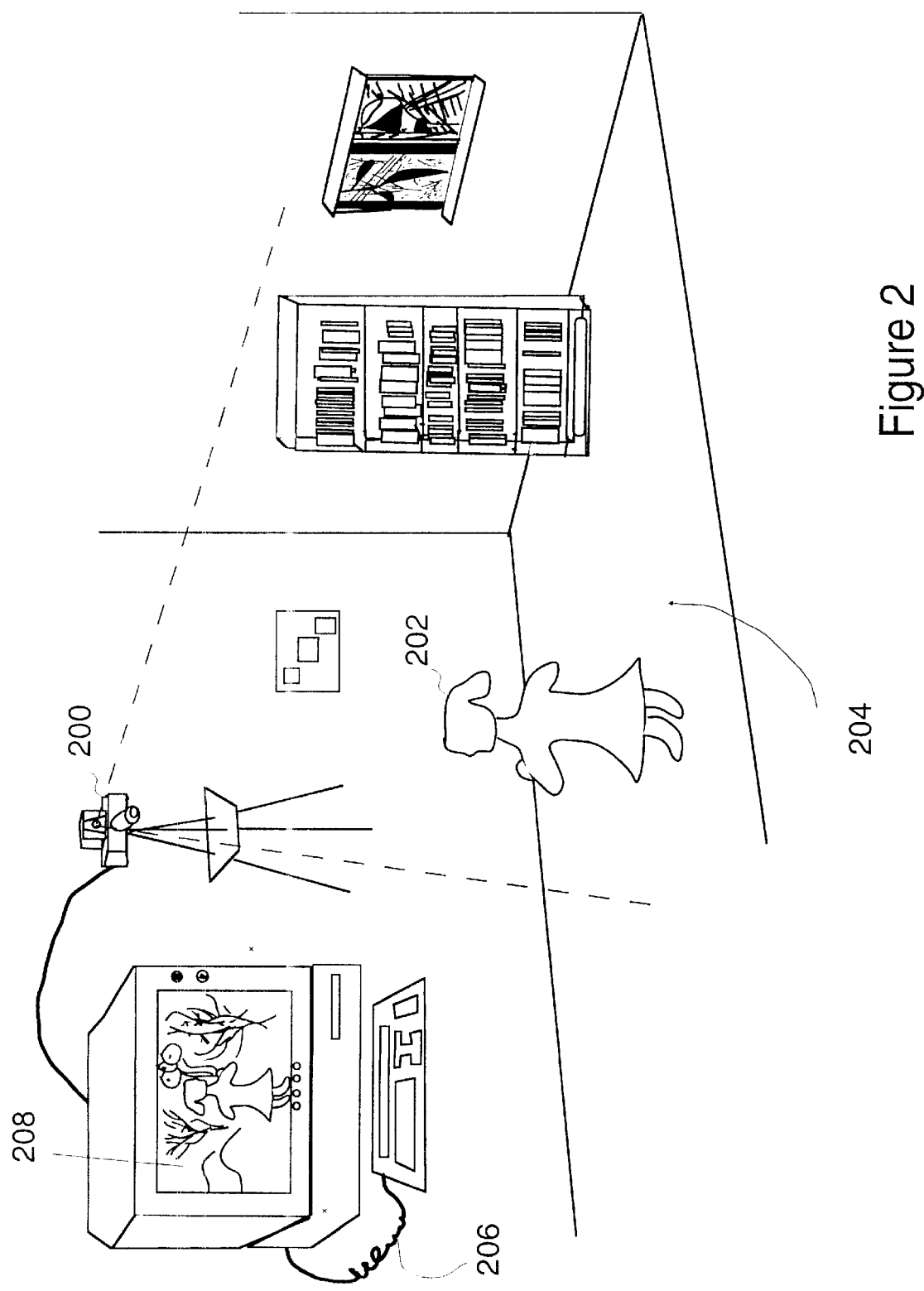
FIG. 2 is a perspective view of an object compositing system using a single camera.

FIG. 2 is a perspective view of an object compositing system using a single camera 200. The figure shows an object 202, a child, in front of camera 200 standing in a bedroom 204 as a background. The camera is connected to a general-purpose computer 206. Camera 200 captures the image of the child 202 with the bedroom 204 as the background image. The image is then transmitted to general-purpose computer 206 and processed thereby compositing the child 202 onto a destination image 208. A preferred embodiment of the object compositing procedure is described below.

Figure 3A:
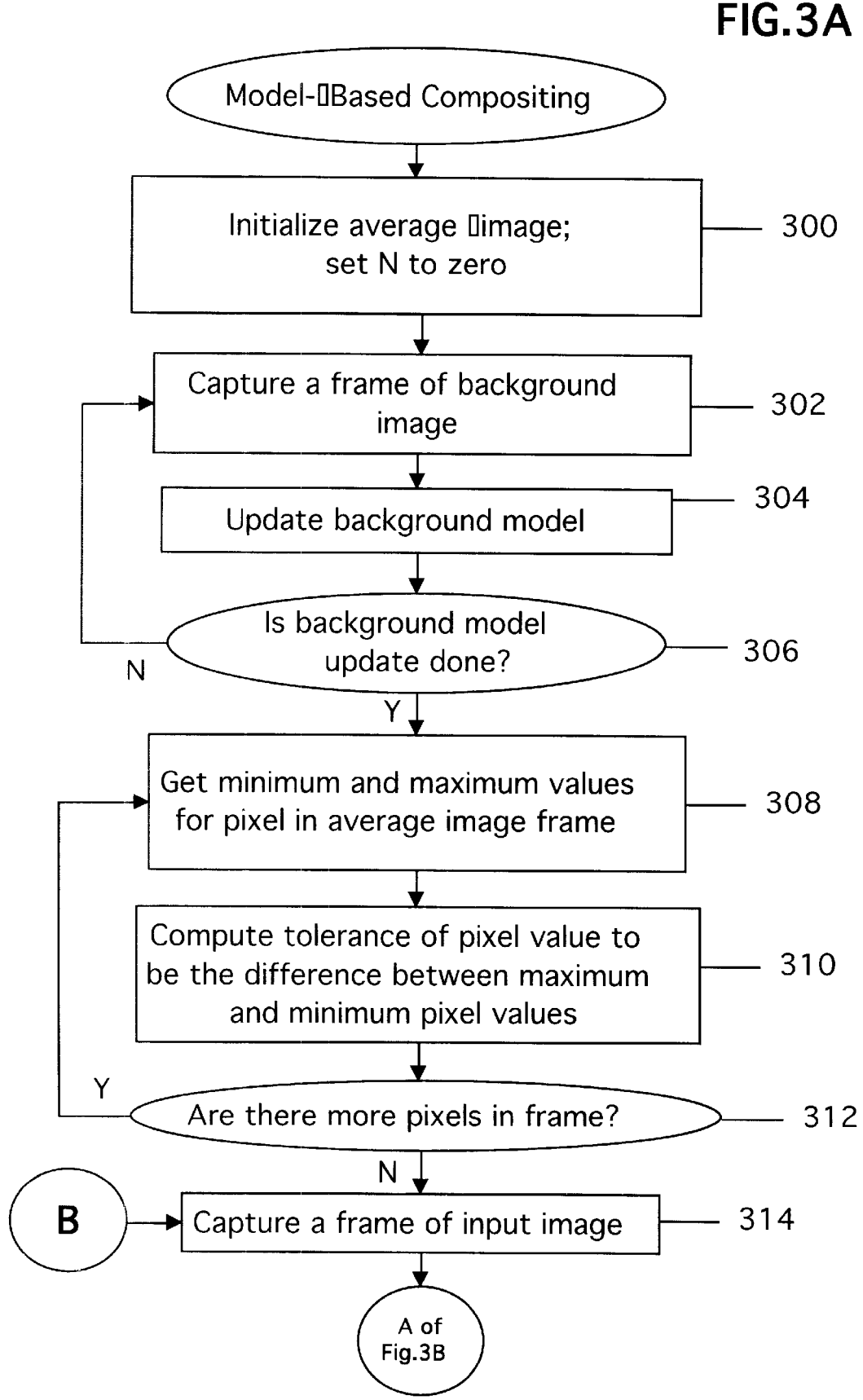
FIGS. 3A and 3B are flowcharts showing a preferred embodiment of a method for model-based compositing of the present invention.
Figure 3B:
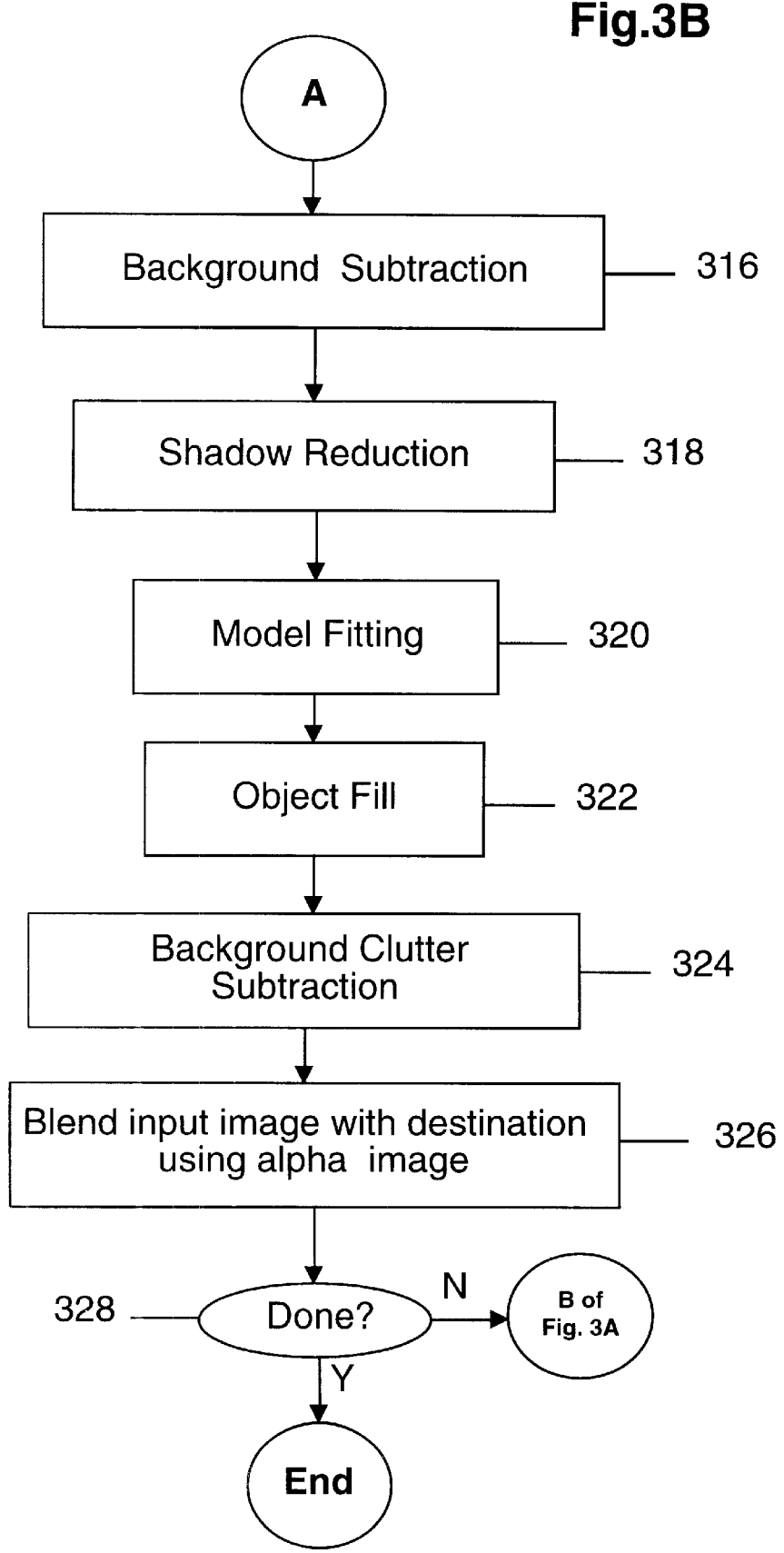

FIGS. 3A and 3B are flowcharts showing a preferred embodiment of a method for model-based compositing of the present invention. At 300 the system is initialized by setting the variable N to zero. N is the number of iterations the system will perform to create a background model. A background model ("average image") is created or built by averaging several frames of a background image. An average image is essentially an image of a backdrop that does not contain the object that is being composited. For example, an average image could be a simple image of a living room or a child's bedroom. The background model is essentially a model of the generally static (i.e., non-moving or unchanging) background in which the object being composited, such as a person, will enter. Before the object enters, however, this background model must be created. At 302 the system captures one frame of the background image. With every image frame captured, the system updates the background model as shown block 304. The process of updating the background model involves updating the average image and maintaining a minimum and maximum pixel value chart for each pixel in the average image examined as well as updating the average image. These charts are maintained by comparing the value of the pixel to the minimum and maximum value of that pixel based on previous images. This process is described in greater detail in FIG. 6. Blocks 302 and 304 are described in greater detail in FIGS. 4 and 5 respectively.

At 306 the system determines whether the background model update is complete by checking if the number of iterations (i.e., number of captured frames of the average image) has reached N. As mentioned above, N is the number of iterations the user wants the system to perform in order to create the background model. For example, the user may want the system to go through 30 or a 100 iterations to build the background model depending on how much time the user wants to spend building the model and how accurate the user wants it to be. If the number of iterations has not reached N, the system returns to block 302 where another frame of the average image is retrieved. If the number of iterations has reached N and no more frames are needed to build the background model, the system proceeds to block 308.

At 308 the system retrieves the minimum and maximum values for each pixel in the average image from the minimum and maximum pixel value charts discussed above. At 310 the system computes the tolerance for each pixel value to be the difference between the maximum pixel value and the minimum pixel value for that pixel. For many of the pixels that are stationary, this tolerance will be close to zero. The tolerance for non-static pixels will likely be greater than zero. At 312 the system checks whether there are any more pixels. If there are more pixels, the process returns to block 308 where the minimum and maximum values for the next pixel in the average image are retrieved. If there are no more pixels in the average image, the process continues with block 314.

At 314 the system captures a frame of an input image. The input image is essentially a background image containing the object being composited. For example, the object could be a human being (e.g., a child) and the background image could be a living room or bedroom. At 316 the system begins creating a new image called the alpha image which contains a representation of the object being composited by first isolating the object. This is first done by subtracting the background from the input image. The background subtraction block is described in greater detail in FIG. 8A.

In a preferred embodiment, the system performs a procedure for improving the alpha image referred to generally as shadow reduction at 318. This procedure reduces the effect of shadows cast by the object on other background objects in creating the alpha image. It is described in greater detail in FIGS. 9A and 9B.

In another preferred embodiment, the system performs another procedure for improving the alpha image called model fitting as shown at 320. In this block the system creates a configuration of templates where each template fits entirely within a particular part of the object. For example, if the object is a person, one template could be for the torso or head. The configuration of templates make up the model which fits the object. The model fitting allows the system to fill up holes in the object while the object is being created in the alpha image. This process is described in greater detail in FIGS. 10A to 10D. The block following the creation of the templates is simply that of matching each template to its appropriate object part and setting the alpha pixels within the templates to one. This object fill process is shown at 322 and is described in greater detail in FIG. 11. FIG. 8 is the alpha image, which now contains less holes than the previous alpha image, after the object fill block.

At 324 the system eliminates as much background clutter and artifacts as possible without affecting the object itself. In order to do this it assumes that artifacts greater than a predetermined distance from the closest template (created in block 320 above) is clutter or some type of extraneous artifact not part of the object being composited and ensures that it is not composited onto the destination image.

At 326 the system uses the alpha image to blend the object from the input image onto the destination image. This procedure, known in the art as an alpha blend, uses the value of the pixels in the alpha image to determine which pixels from the input image should be blended onto the destination image. It is described in greater detail in FIG. 13. Once the alpha blend is complete, the system checks whether there are any other images to be composited at 328. If there are, the system returns to block 314 where it captures a frame of the next input image that contains the new object to be composited.

Figure 4:
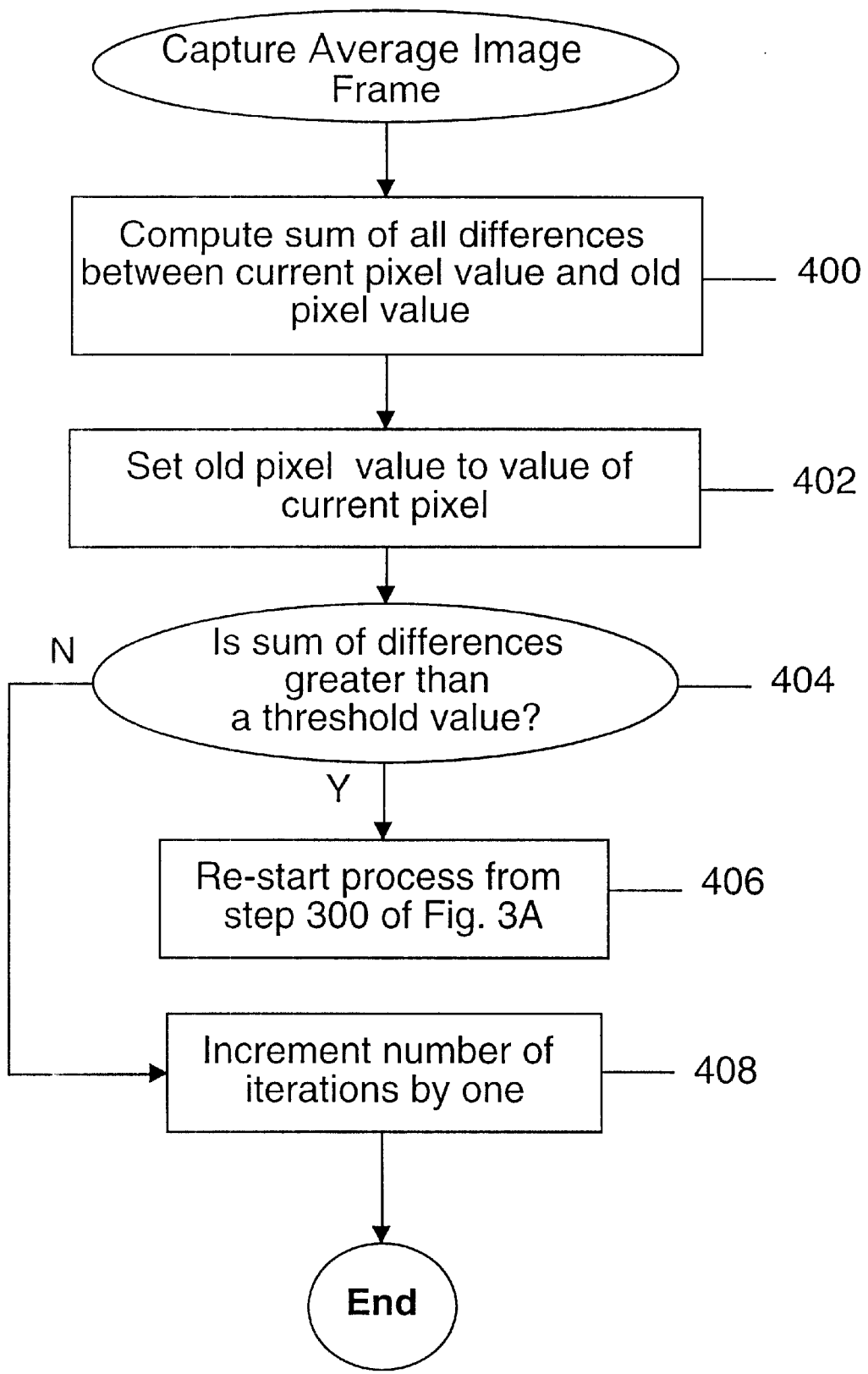
FIG. 4 is a flowchart showing a process for capturing a frame of an average (background) image.

FIG. 4 is a flowchart showing a process for capturing a frame of an average (background) image. At 400 the system computes the sum of all differences between the current pixel value of an image just captured and the previous pixel value from an image captured immediately before the current image. In a preferred embodiment, this is done through the formula:

$$sum = \sum_i \sum_j P(i, j) - |P_0(i, j)|,$$

where i and j are coordinates for each pixel.

The current pixel is from the image that was captured in the present iteration. Thus, at 400 the system looks at the current value and the previous value for each pixel in the average image frame. At 402 the system prepares for the next iteration by setting the value of the previous pixel value to the current pixel value ($P_0=P$)

At 404 the system determines whether the sum of the differences computed block 400 is greater than a predetermined threshold value. If not, the system proceeds to 408 where the number of iterations is incremented by one. If the number of iterations reaches N, the process of capturing frames of an average image is complete. If the sum of differences is greater than the threshold value, then there has been too much activity in the background image thereby preventing a background model from being built. This can occur, for example, if a large object passes through the image or if an object in the image is moved. The threshold value is set such that some non-static activity, such as a television screen displaying images or a window showing a road with occasional passing objects, is acceptable and will not prevent a background model from being built. However, significant activity will cause the system to re-initialize itself (setting N to zero) and re-starting the process from block 300 of FIG. 3A as shown block 406.

Figure 5:
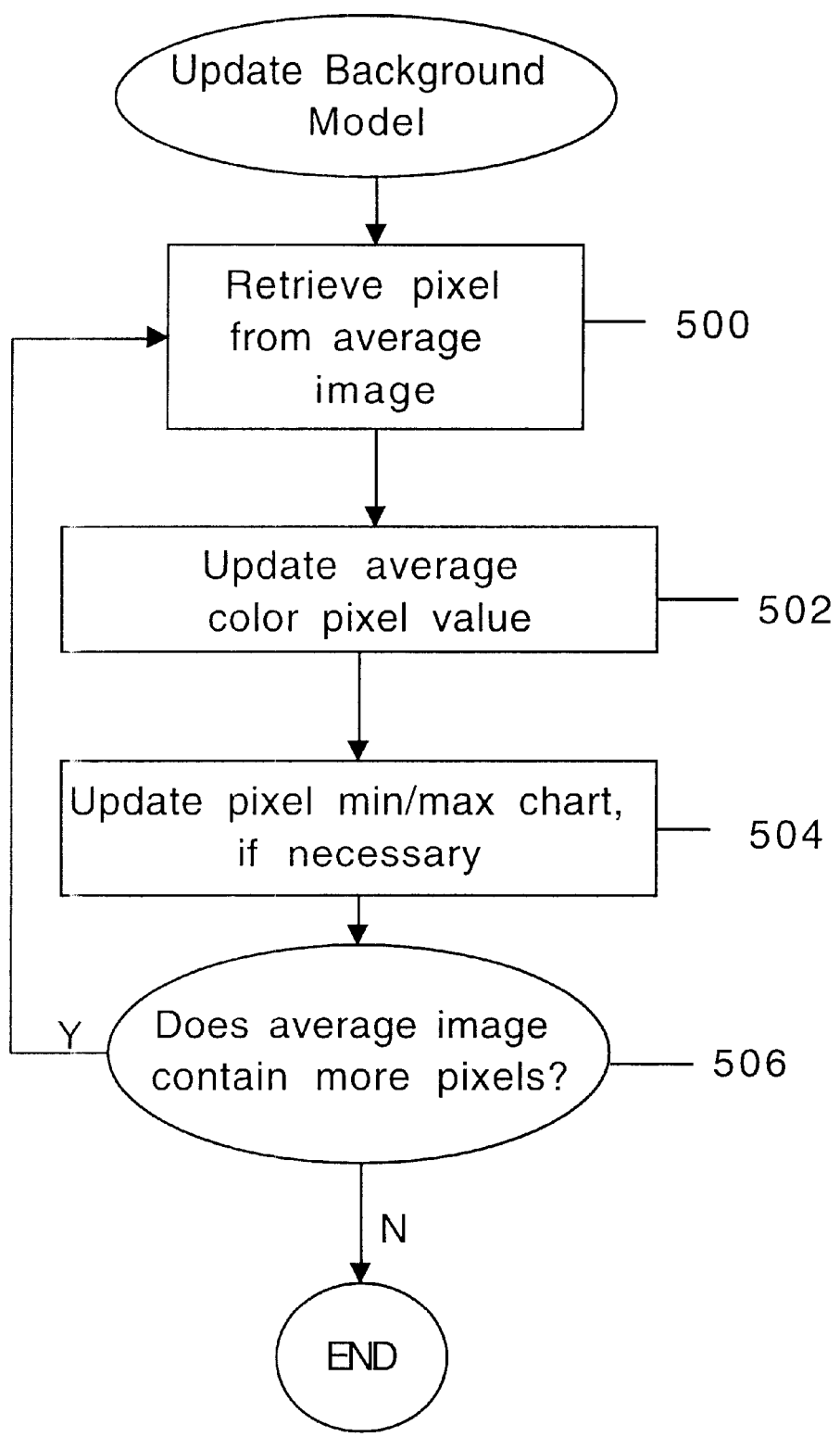
FIG. 5 is a flowchart showing a process for updating the background model.

FIG. 5 is a flowchart showing a process for updating the background model. The background model is updated, if necessary, with each new background image frame captured as described in FIG. 4. Once the number of frames captured equals N, the updating process is complete and the background model has been created. Like all images discussed herein, the average (background) image is comprised of pixels. At 500 the system retrieves a pixel from the average image. At 502 the system updates the average image color pixel value. Each pixel in the average image has an average color value. The average color value for the pixels is determined in a preferred embodiment according to the RGB color scheme, well-known in the art. Other color schemes such as YUB can also be used in another preferred embodiment. A low pixel color value indicates a dark pixel. Thus, a color pixel value of zero would essentially be a black pixel. Similarly, the brightest pixel will have the maximum color value for a pixel. By way of example, the pixel from the average image corresponding to the pixel retrieved in block 500 can have a color pixel value of 0.4 and the pixel in the current frame can have a color pixel value of 0.3. If an averaging coefficient of 0.5 is used, the system would just update the average color pixel value for that particular pixel from 0.4 to 0.35, i.e., (0.5)(0.4)+(0.5)(0.3)=0.35.

In building the background model, the system also maintains a minimum image and a maximum image. The minimum color image and the maximum color image are used to provide a tolerance or variance for each pixel in the background model. A pixel that is part of a stationary object, for example a piece of furniture in the living room, will have little variance or none at all. Any variance for such a pixel would most likely result from camera noise. On the other hand, a pixel that is part of a background image that is dynamic, such as a television screen or the view through a window, will have a greater tolerance. Such pixels are not stationary and the brightness of such pixels can vary while the background model is being updated. For these pixels, the system needs to have a variance or tolerance level. At 504 the system updates the minimum and maximum values for each pixel if needed. The minimum and maximum values for each pixel provides the tolerance for each pixel. Thus, if the new color pixel value is less than the previous minimum color value for that pixel, the minimum value is updated. Similarly, if the color pixel value is greater than the maximum value for that pixel the maximum value is updated. Block 504 is described in greater detail in FIG. 6. At 506 the system checks to see whether there are any more pixels in the average image that need to be checked. If there are, the process returns to block 500 where the next pixel from the average image is retrieved. If not, the system returns to the background model update process as shown in block 306 of FIG. 3A.

Figure 6:
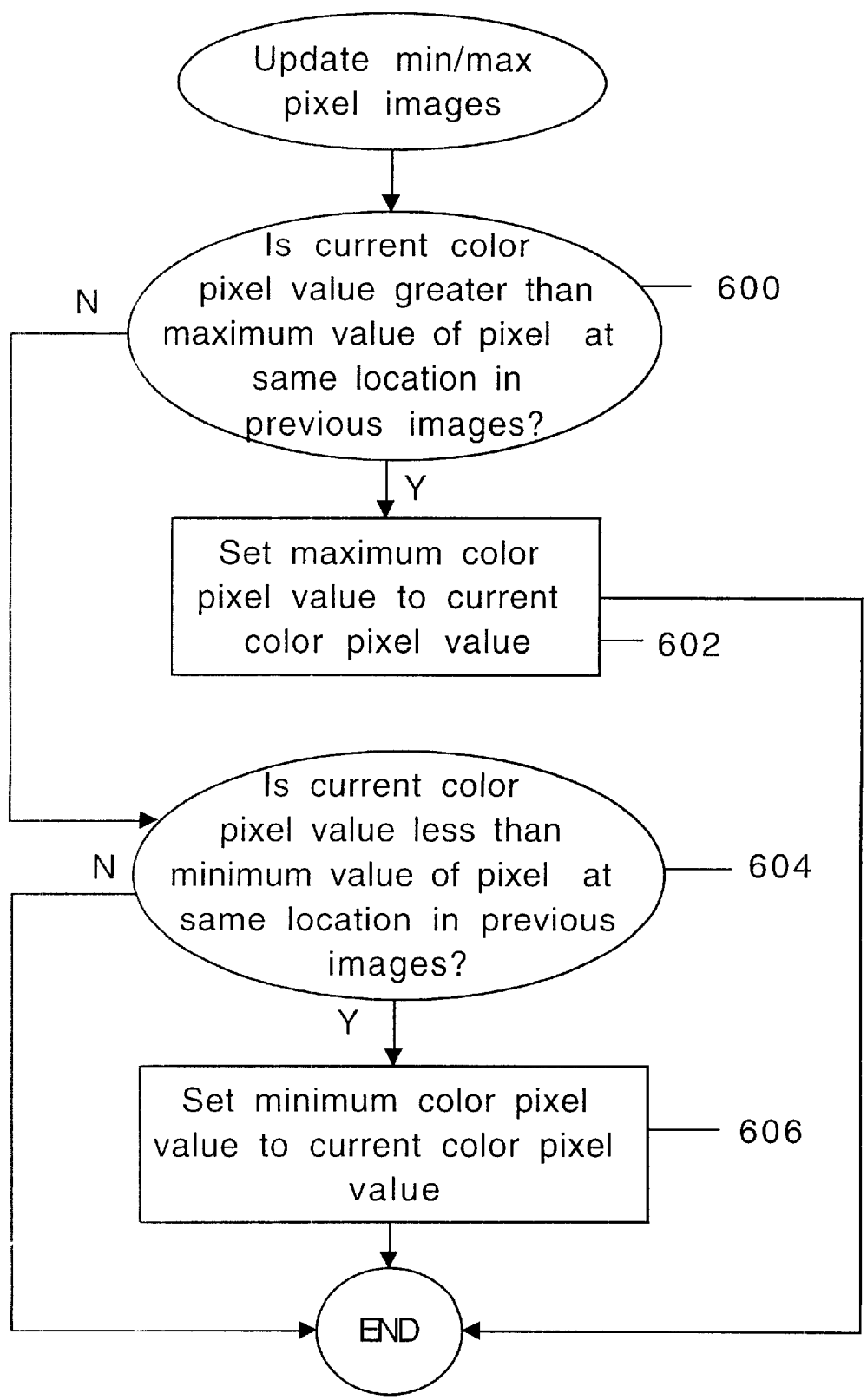
FIG. 6 is a flowchart showing a process for updating the minimum and maximum values for pixels in the average image.

FIG. 6 is a flowchart showing a process for updating the minimum and maximum values for pixels in the average image. At 600 the system determines whether the color pixel value of the pixel just retrieved is greater than the maximum value of the corresponding pixel from previous frames. If the current color pixel value is greater, the system sets the maximum color pixel value to the current color pixel value in block 602. Once this is done, the maximum color value for the pixel in that location is set to a new high value. If the current color pixel value is not greater than the maximum value, the system proceeds to block 604. At 604, the same process as in blocks 600 and 602 takes place except the minimum color pixel value is compared to the color pixel value of the pixel just retrieved. If the current color pixel value is less than the minimum value, the system sets the new minimum color pixel value to the current color pixel value in block 606. Once the system determines whether the minimum or maximum pixel values need to be updated, the system continues the process of updating the background model.

Figure 7A:
FIG. 7A is a replica of a sample background model or average image.
Figure 7B:
FIG. 7B is a replica of a sample input image consisting of the background image including the object being composited.

FIG. 7A is a replica of a sample background model or average image. It shows a typical office without the object to be composited. FIG. 7B is a replica of a sample input image (discussed below) that consists of the average image including the object being composited, in this example, a figure of a person.

Figure 8A:
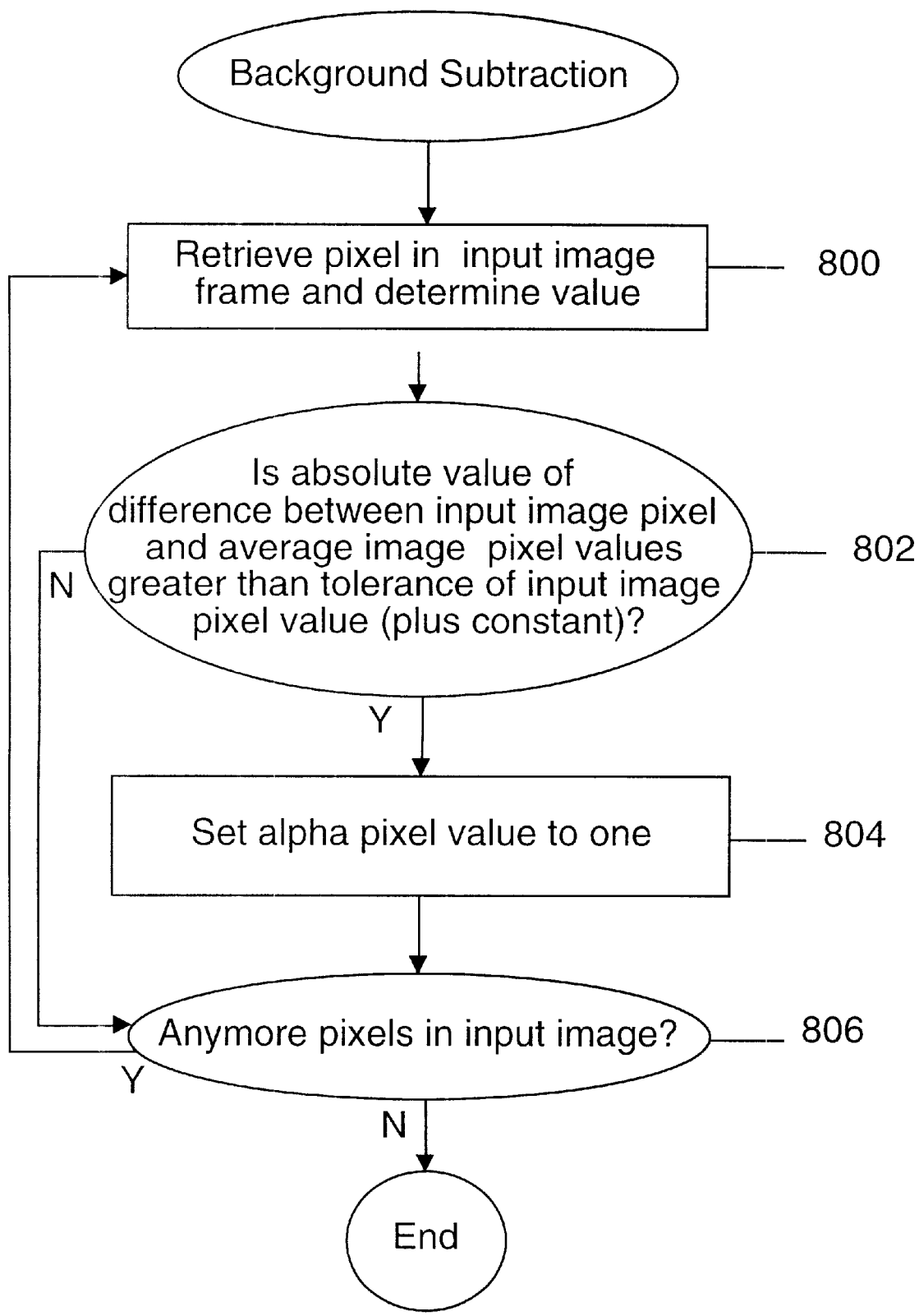
FIG. 8A is a flowchart showing a process for subtracting a background to isolate the object being composited.

FIG. 8A is a flowchart showing a process for subtracting a background to isolate the object being composited. Background subtraction is basically the first process in creating an alpha image of the object that is being composited to a destination image. Each frame of an alpha image is digitally composed such that each pixel is either a 0 or 1 based on whether that pixel is either part of the object. If a pixel has a value of one, that pixel is within the object being composited. Where the value of the alpha pixel is zero, the pixel is not part of the object (i.e., it may be part of the background) and is not composited onto the destination image. As will be described in greater detail below, the alpha image is used in an alpha blend, a technique well-known in the art, to blend the object in the input image with the destination image.

At 800 of FIG. 8A the system retrieves a pixel in the input image frame. As mentioned above, the input image contains the background and the object being composited. The system also determines its value and sets it to be the current pixel value. At 802 the system determines whether the absolute value of the difference between the current pixel value and the value of its corresponding pixel from the average image is greater than the tolerance of the current pixel plus a constant. As described block 310 of FIG. 3A, each pixel in the average image has a tolerance which is essentially the difference between the maximum and minimum pixel values. If the absolute value of the difference between the current pixel value and the average image pixel value is greater than the tolerance of the current pixel, the system proceeds to block 804 where the system sets the alpha pixel value to one. This indicates that the pixel retrieved from the input image is part of the object because that pixel's color value has changed greater than a "tolerable" amount. A color value change this significant means that there is a new pixel in that position, and that new pixel could be part of the object since the object is the main change in the background model. If the absolute value of the difference is not greater than the tolerance of the current pixel value, the system proceeds to block 806 and simply checks whether there are any more pixels in the input image frame. If there are pixels remaining in the frame the system returns to block 800 and repeats the process. Otherwise, the background subtraction process is complete. It should be noted that in a preferred embodiment, the alpha image is initially set to all zeros and the value for each pixel in the alpha image is changed to one only if the corresponding pixel in the input image frame is determined to be part of the object that is being composited. Otherwise the value of the alpha pixel is unaffected.

Figure 8B:
FIG. 8B shows an initial alpha image of an object being composited after the background subtraction procedure described with respect to FIG. 8A is done.

FIG. 8B shows an initial alpha image of a person being composited after the background subtraction procedure described with respect to FIG. 8A is done. The object being composited in this example is the same as in FIG. 7. Since the background subtraction procedure is only the first step in creating the alpha image, some defects in the image are evident. For example, there may be holes in the middle of the object as represented in the alpha image. Those pixels have a value of zero when they should be one. These defects may occur, for example, if the tolerance for a particular pixel in the background model was not sufficiently large enough to recognize that the pixel belonging to the object is a new pixel. Referring back to block 802 of FIG. 8A, in sum, the system determines whether a pixel in the input image is part of the background model or part of the object.

Figure 9A:
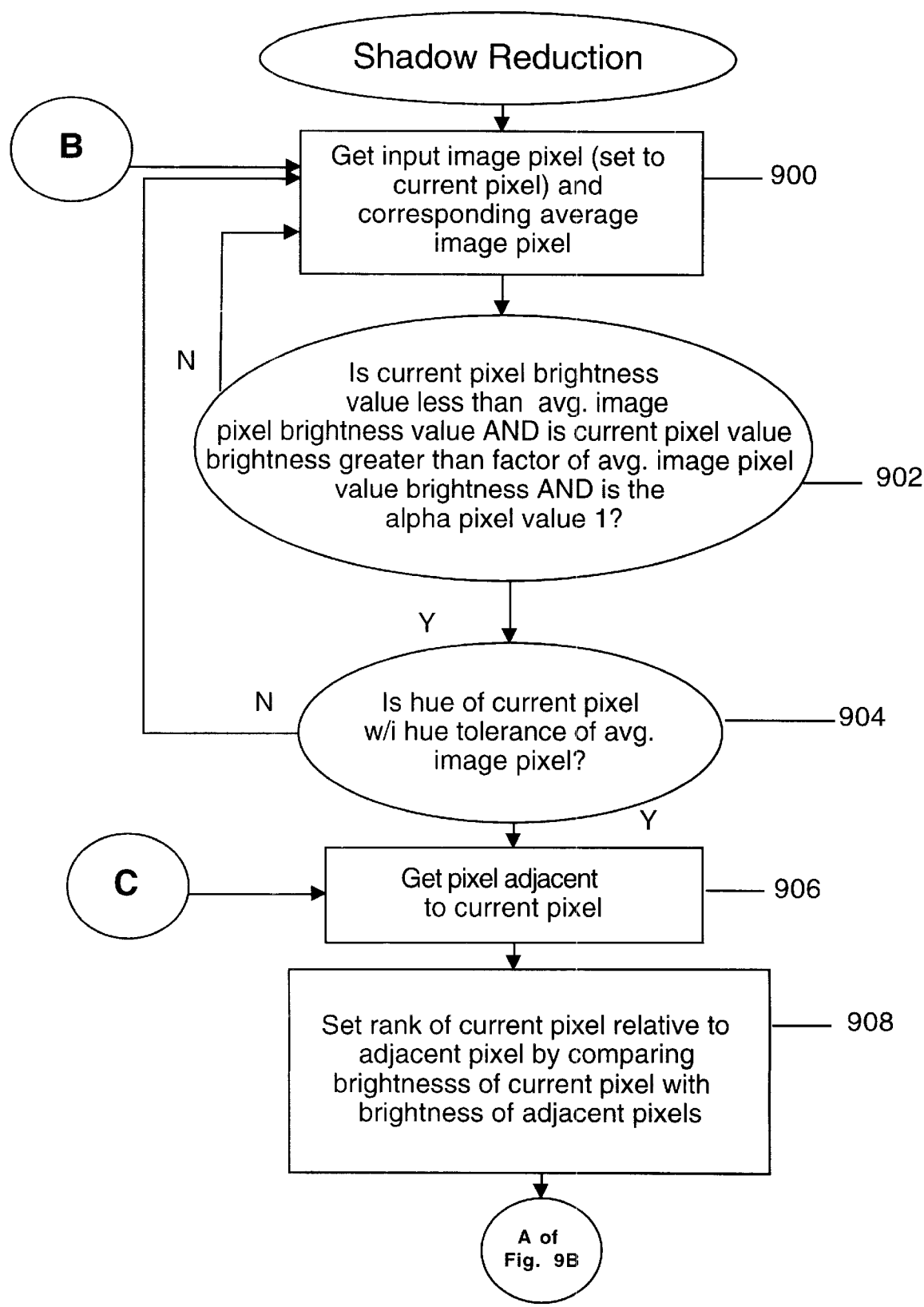
FIGS. 9A and 9B are flowcharts a process for showing a preferred embodiment of the shadow reduction process.
Figure 9B:
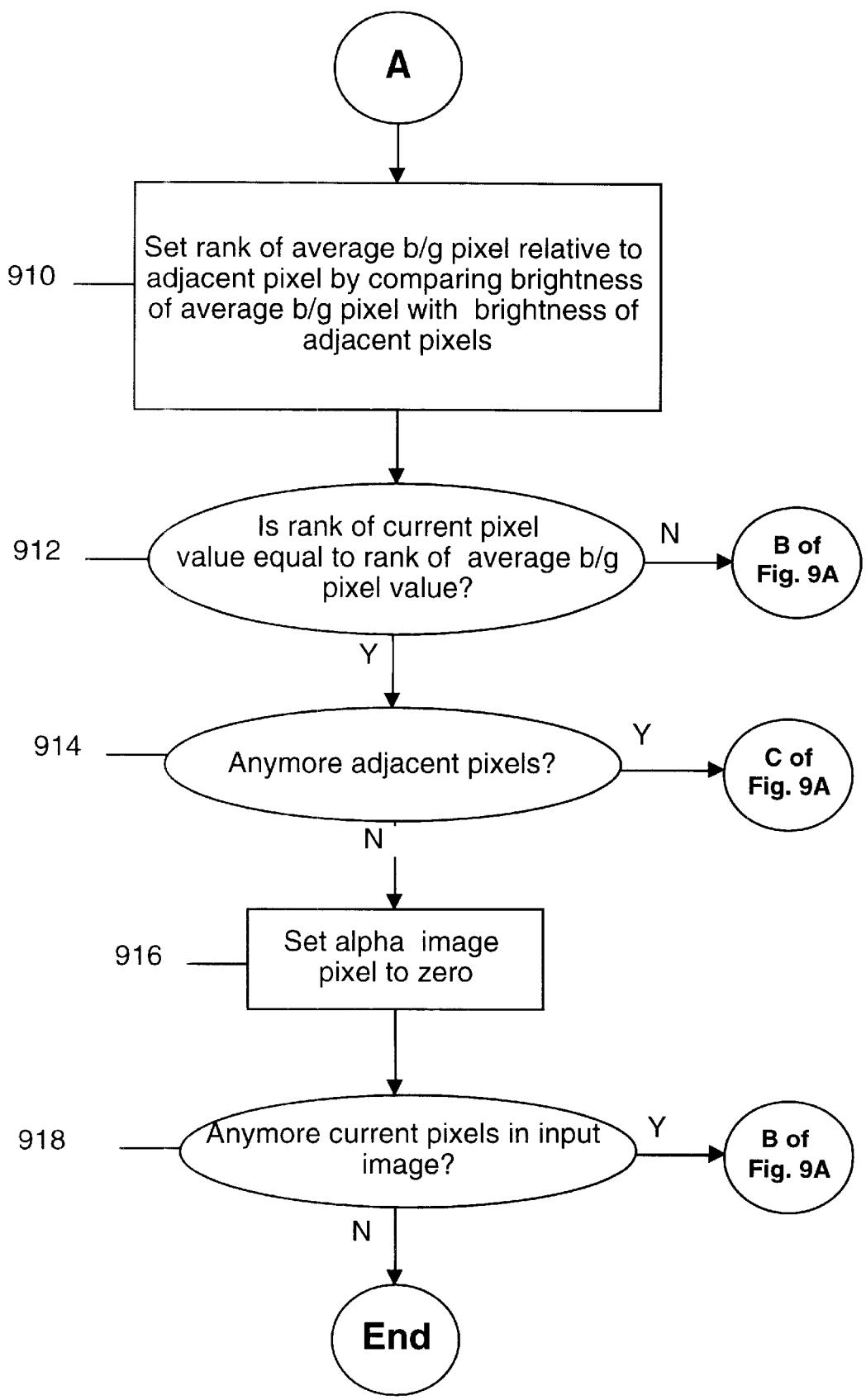
Figure 10A:
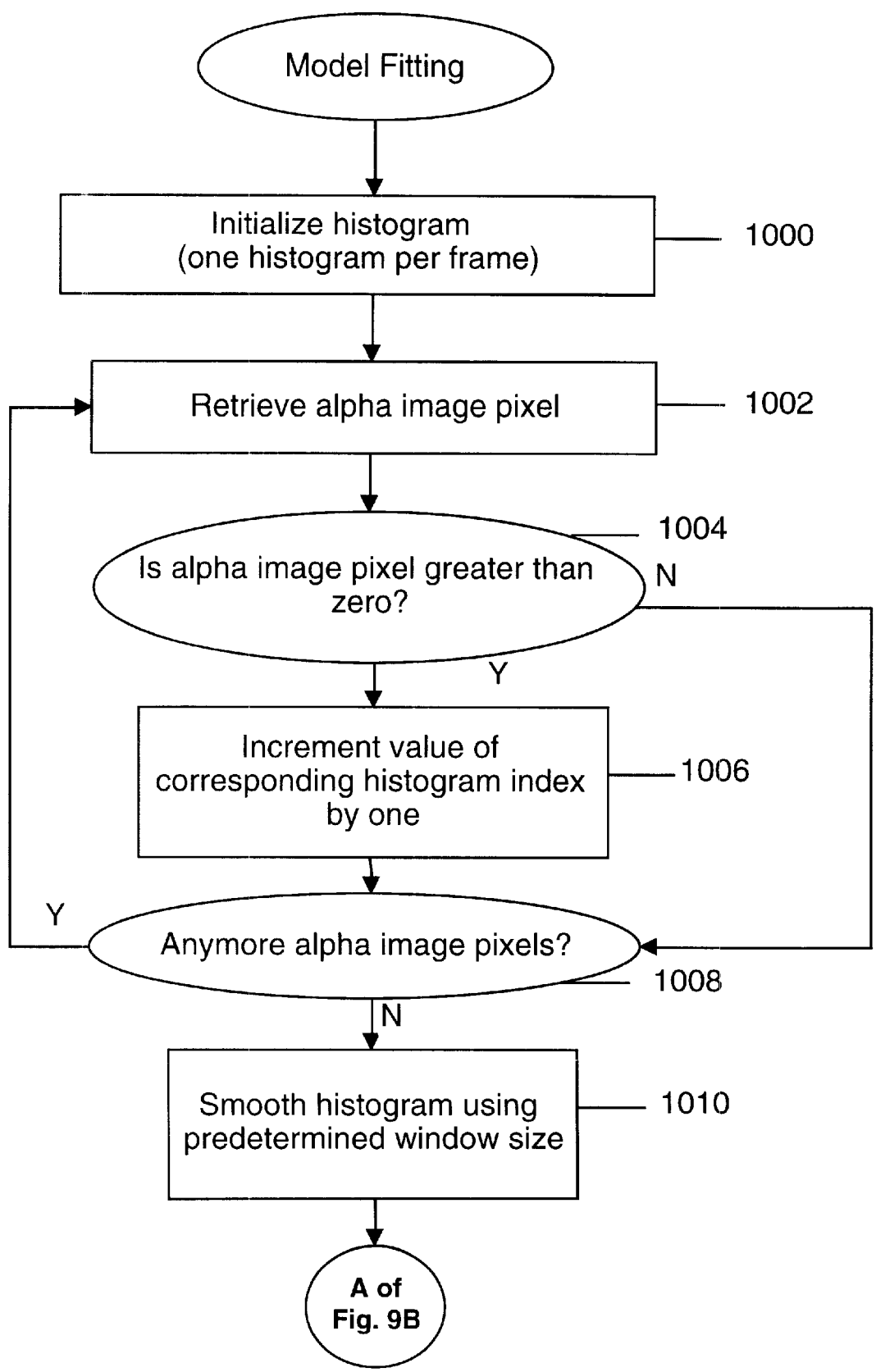
Figure 10B:
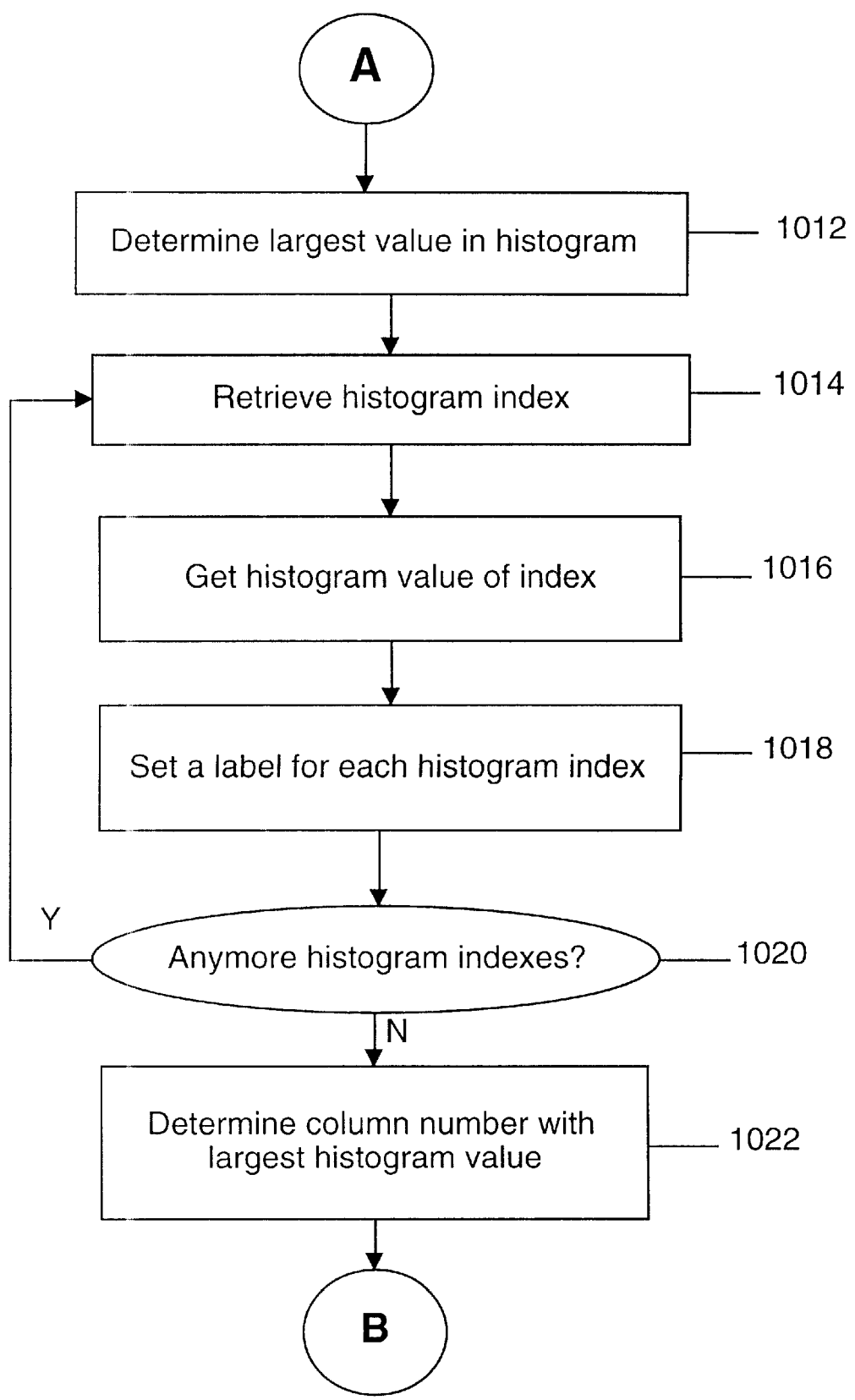
Figure 10D:
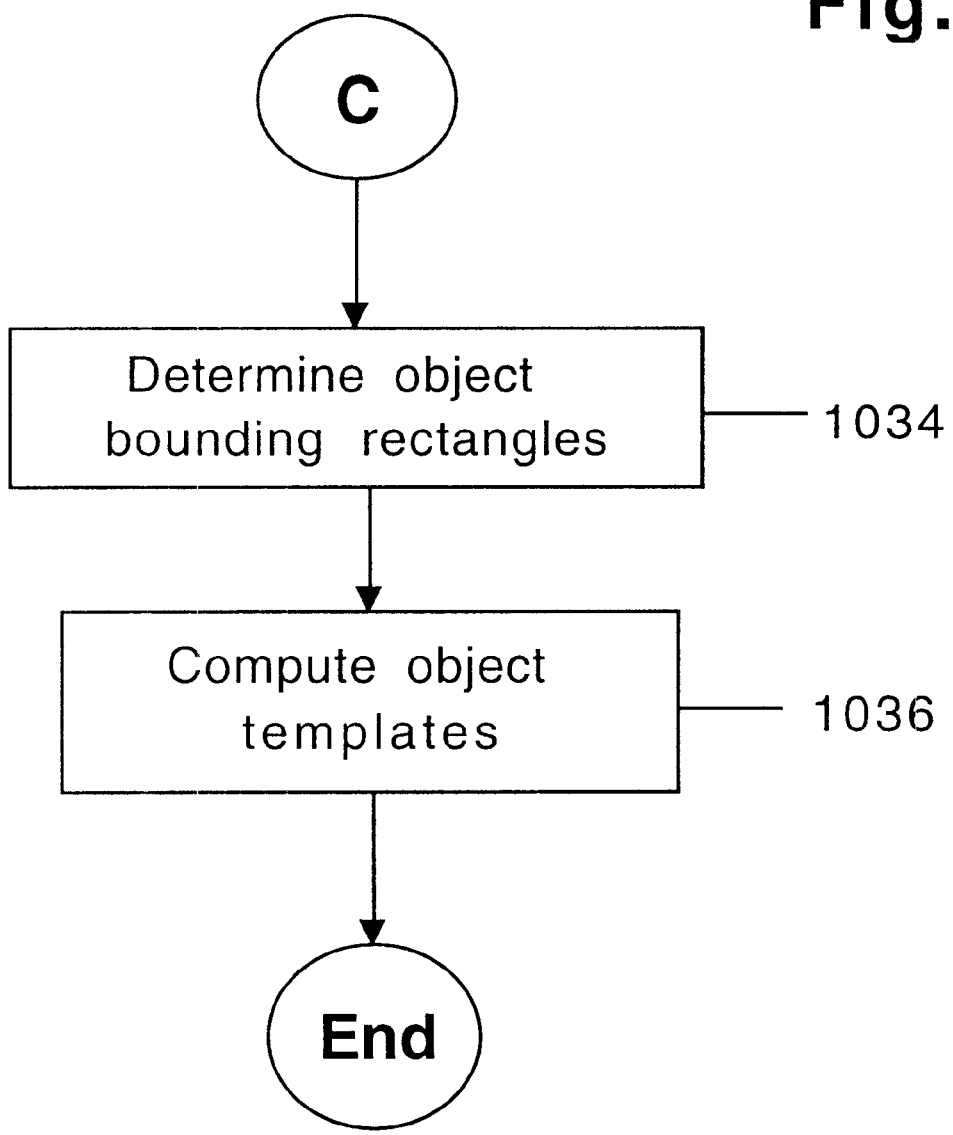

FIGS. 9A and 9B are flowcharts of a process for showing a preferred embodiment of the shadow reduction process. The purpose of shadow reduction is to improve the image of the object in the alpha image. The object in the alpha image should have a clear delineation or outline of the object being composited. Thus, it should not include any shadows created by the object in the input image. At 900 the system retrieves a pixel from the input image (the "current" pixel) and a pixel from the average image. At 902 the system performs a series of comparisons. First, the system determines whether the brightness of the current pixel, represented by a particular value, is less than the brightness of its corresponding pixel in the average image. It then determines whether the brightness of the current pixel is greater than a particular factor of the brightness of the average image pixel. Finally, in a preferred embodiment, it determines whether the corresponding alpha image pixel value is one. If all three of these conditions are true, the system then proceeds to block 904.

At 902 the system is essentially determining whether a particular pixel is part of a shadow or part of the object by examining the brightness of the pixel. The pixel is likely to be part of a shadow if it is darker than its corresponding pixel in the average image, which does not contain any shadows cast by the object since the object is not in the average image. At the same time, the pixel cannot be too dark. If it is too dark, it is probably part of the object and should be treated as such. Thus, in block 902 the system examines the brightness of the pixel as opposed to the hue which is examined in block 904. A pixels brightness can change while its hue remains the same. For example, a red pixel may have a high brightness value but if a shadow falls on it, its hue—red—will not change, but its brightness value will very likely decrease depending on the darkness of the shadow. Thus, when a pixel is covered by a shadow the color of that pixel does not change; what may change is the brightness of the particular pixel. At 904 the system examines the hue or color of the pixel. If the pixel is darker and the color stays the same then the pixel is now likely part of a shadow. If the pixel changes brightness and the hue changes, it is likely that the pixel is now part of a new object and that it has not simply been covered by a shadow.

At 904 the system determines whether the hue of the input image pixel retrieved in block 900 is within a tolerance of the hue of the average image pixel. The tolerance here is not the same tolerance calculated in block 310 of FIG. 3A. In a preferred embodiment, the tolerance of the hue of the average image pixel is a predetermined value.

At 906 the system retrieves a pixel adjacent or close to the current pixel. Part of the process in determining whether certain pixels are part of a shadow is to examine pixels surrounding the current pixel. This is to determine what type of pattern surrounds the current pixel. For example, a current pixel may be darker than the corresponding average image pixel, however, it is more likely to be part of a shadow if the texture around the current pixel is similar to the texture around the corresponding pixel in the average image.

In a preferred embodiment, the system calculates a rank statistic based on the brightness of the current pixel in block 908. It computes a rank statistic if the brightness of the current pixel is less than the brightness of the corresponding pixel in the average image. This rank can be calculated using the following formulas:

If |Bright. P(i,j)−Bright. adj. P(i',j')|$\leq R_0$ then
$R_p$ (i,j,i',j')=0
If Bright. P(i,j)>Bright. adj. P(i',j')+$R_0$ then
$R_p$ (i,j,i',j')=1
If Bright. P(i,j)<Bright. adj. P(i',j')−$R_0$ then
$R_p$ (i,j,i',j')=2

The system determines the rank of the current pixel relative to adjacent pixels by comparing the brightness of the current pixel with adjacent pixels. As shown in the formulas above, in a preferred embodiment, a pixel can have a rank of 0, 1, or 2.

At 910 the system sets the rank of the average pixel retrieved in block 900 relative to pixels adjacent to the current pixel by comparing the brightness of the average image pixel with adjacent average image pixels. This rank can be calculated according to the following formulas:

If |Bright. Avg.P (i,j)−Bright.Avg. adj.P(i',j')|$\leq R_0$ then
$R_{avg}$ (i,j,i',j')=0
If Bright. Avg.P (i,j)>Bright.Avg. adj.P(i',j')+$R_0$ then
$R_{avg}$ (i,j,i',j')=1
If Bright. Avg.P (i,j)<Bright.Avg. adj.P(i',j')−$R_0$ then
$R_{avg}$ (i,j,i',j')=2

At 912 the system checks whether the rank of the current pixel value is equal to the rank of the average image pixel value. If the rank of the current pixel is equal to the rank of an average image pixel, the system proceeds to block 914 and checks if there are anymore pixels adjacent to or surrounding the current pixel. If the system determines that the ranks are equal the current pixel is most likely part of a shadow because it is darker and the pattern surrounding the current input image pixel is similar to the pattern surrounding the average image pixel.

If the ranks are not equal the system returns to block 900 where it retrieves the next input image pixel and average image pixel. If this condition is met, the pixel is most likely not a shadow. If there are no more adjacent pixels, the system then sets the alpha image pixel corresponding to the current pixel to zero in block 916. By setting the alpha image pixel to zero it ensures that the alpha image will contain only portions belonging to the object without any shadows surrounding the object. At 918 the system checks whether there are any remaining input image pixels to be checked. If there are the system returns to block 900 and retrieves the next input image pixel and average image pixel. Otherwise, the process for shadow reduction is complete.

In another preferred embodiment, only some of the rank values surrounding the current pixels have to be equal to the rank values surrounding the average pixel.

FIGS. 10A through 10D are flowcharts of a process for matching the object to a model of the object made up of object part templates. In a preferred embodiment, a histogram is created to represent each frame in the input image. At 1000 the system initializes the histogram to zero. At 1002 the system retrieves a pixel from the alpha image. Although the histogram represents one frame of the input image, it is constructed using the alpha image.

At 1004 the system determines whether the alpha image pixel is greater than zero. If it is greater than zero (i.e., the value is one) the system proceeds to block 1006 where the system increments the corresponding histogram index (column) value by one. Thus, if an alpha image pixel is one, indicating that it is part of the object, the corresponding histogram index value is incremented by one. If the alpha image pixel is not greater than zero the system proceeds to block 1008 where it checks for more alpha image pixels. If there are remaining pixels in the alpha image, the system returns to block 1002 where it retrieves the next pixel and repeats the process. Through this process the histogram index values increase if corresponding alpha pixels have a value of one.

If there are no more alpha image pixels, the histogram is completed and the system smoothes the histogram using a predetermined window size as shown block 1010. The histogram as originally formed is very likely to be choppy and erratic. Thus, it is useful to have the histogram smoothed by using, in a preferred embodiment, a low-pass filter, so that all histogram values within the window is set to the average histogram of all the values within the window. After the histogram is smoothed in 1010, the system determines the highest value of all the columns in the histogram. As discussed above with respect to blocks 1004 and 1006, each column has a value that is set according to the number of alpha pixels with a value of one. Thus, block 1012, the system determines the highest value out of all the columns.

At 1014 the system retrieves an index or column in the histogram which is initially the first index. At 1016 the system determines the value of the histogram index retrieved block 1014. At 1018 the system sets a label for each histogram index in the histogram. As described above, each histogram is made up of a set number of columns (i.e., the number of pixel columns in an alpha image frame), where the column number is referred to as an index. In a preferred embodiment, each index has a label of either zero, one or two. The label is based on the index's value. Those indexes with high values get a label of two and those with a low value or a zero value get a label of zero.

At 1020 the system checks whether there are any more indexes in the histogram. If there are, the process returns to 1014 and the next histogram index is retrieved. If there are no more indexes in the histogram, the process continues to 1022 where the system determines the index that has the largest histogram value. To illustrate these blocks with a simple example, suppose the object being composited is a person standing up with both arms stretched out to the left and the right, feet together, and that the person is positioned in the middle of the frame. The column going up the middle of the figure (from foot to top of head) will very likely have the highest index value since that column will have the most alpha pixels with value one. This center column along with columns to its left and right unto the person's shoulders may all have a index label of two, since they represent columns with the most alpha pixels with value one. The columns going through the arms will have index values much smaller than those going through the person's leg, torso, and head. The indexes of the columns going through the person's arms will likely have a value of one. The columns beyond the left and right arms will have values of zero or close to zero and have labels of zero. The process of setting outer-limit indexes according to label values is described in the blocks below.

At 1024 the system sets the far left of the object (as the object is viewed in the frame or, from the object's point of view, the object's right side) to the smallest index which has a label greater than zero. Similarly, at 1026 the system sets the far right of the object to the largest index which has a label greater than zero. With these two blocks the system is establishing some of the preliminary data needed for computing bounding rectangles used in building the object model. Using the example of the person as the object, the column corresponding to the end of the person's right hand is set to the smallest index and the column corresponding to the end of the person's left hand is set to the largest index. At 1028, the system sets the left of the object center to the smallest index with a label greater than one. Similarly, the system sets the right of the object center to the largest index with a label greater than one in 1030. Using the same example, the left and right of the object centers may generally correspond to the end of the person's right and left shoulders. Columns corresponding to these positions will likely have an index value of two. At 1032, the system establishes data with respect to the object height by determining the highest y-coordinate of the object's apex and the lowest y-coordinate of the object's lowest point. With blocks 1024 to 1032, the system is establishing the general outer boundaries of the object being composited.

At 1034 the system computes the dimensions of the rectangles bounding different portions of the object using the data derived in the previous blocks. Using the example of the person as the object, two of the bounding rectangles can cover both the arms, two other rectangles can cover both the legs (or one rectangle depending on how close the legs are to each other), and another rectangle for the person's head. At 1036, the system uses the bounding rectangles to compute templates for the object where a configuration of the templates make up the model fitting the object. In a preferred embodiment, the templates can have different shapes. A template must fit entirely within the portion of the object it is meant to represent. For example, a template meant for the person's head must be of a geometric shape, such as a polygon, that fits completely within the person's head. This is necessary because later in the process, specifically block 322, all alpha pixels within the templates will be set to one. Thus, if a template goes beyond the outline of the object, that portion extending outside of the object will be considered part of the object. The result will be an artificial straight-edged portion protruding from the natural outline of the object being composited.

However, by keeping the templates completely within the outline of the object and automatically setting the value of the alpha pixels within the templates to one, the system fills holes that may have been present in the alpha image thereby improving the appearance of the object once composited onto the destination image. This is done in block 322 of FIG. 3B. Thus, the alpha image as shown in FIG. 8B is now improved because it will contain less holes.

Figure 11:
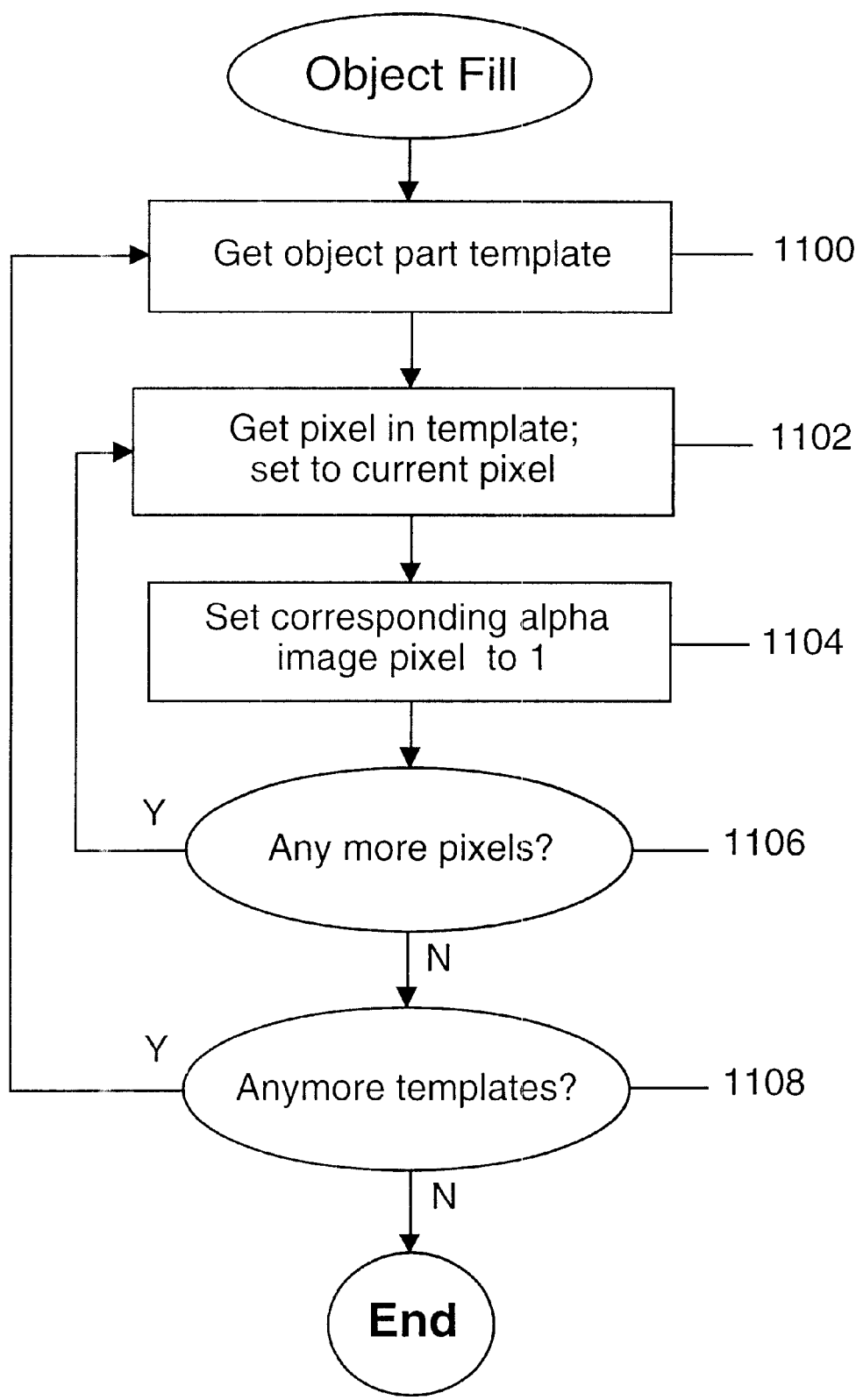
FIG. 11 is a flowchart showing the process for fitting parts of the object with the templates.

FIG. 11 is a flowchart of a process for fitting parts of the object with the templates. At 1100 the system retrieves a template for a particular part of the object. The template was created by the method described with respect to FIGS. 10A to 10D. For example, if the object is a person, the template retrieved could be for one of the arms or for the torso. At 1102 the system retrieves the first input image pixel contained within the template and sets that pixel to the current pixel. At 1104 the system sets the current pixel's corresponding pixel in the alpha image to one. At 1106 the system checks whether there are any remaining pixels contained within the template. If there are, the system returns to 1102 and retrieves the next pixel in the template and repeats the process until all the pixels within the template have been set to one. This ensures that any holes that may have existed in the object part being "fitted" by the chosen template have been filled since all the alpha image pixels within the template are being set to one. At 1108 the system checks whether there are any more templates in the model. If so, control returns to block 1100 and the process repeats. If there are no more templates remaining, the object filling process is complete.

Figure 12A:
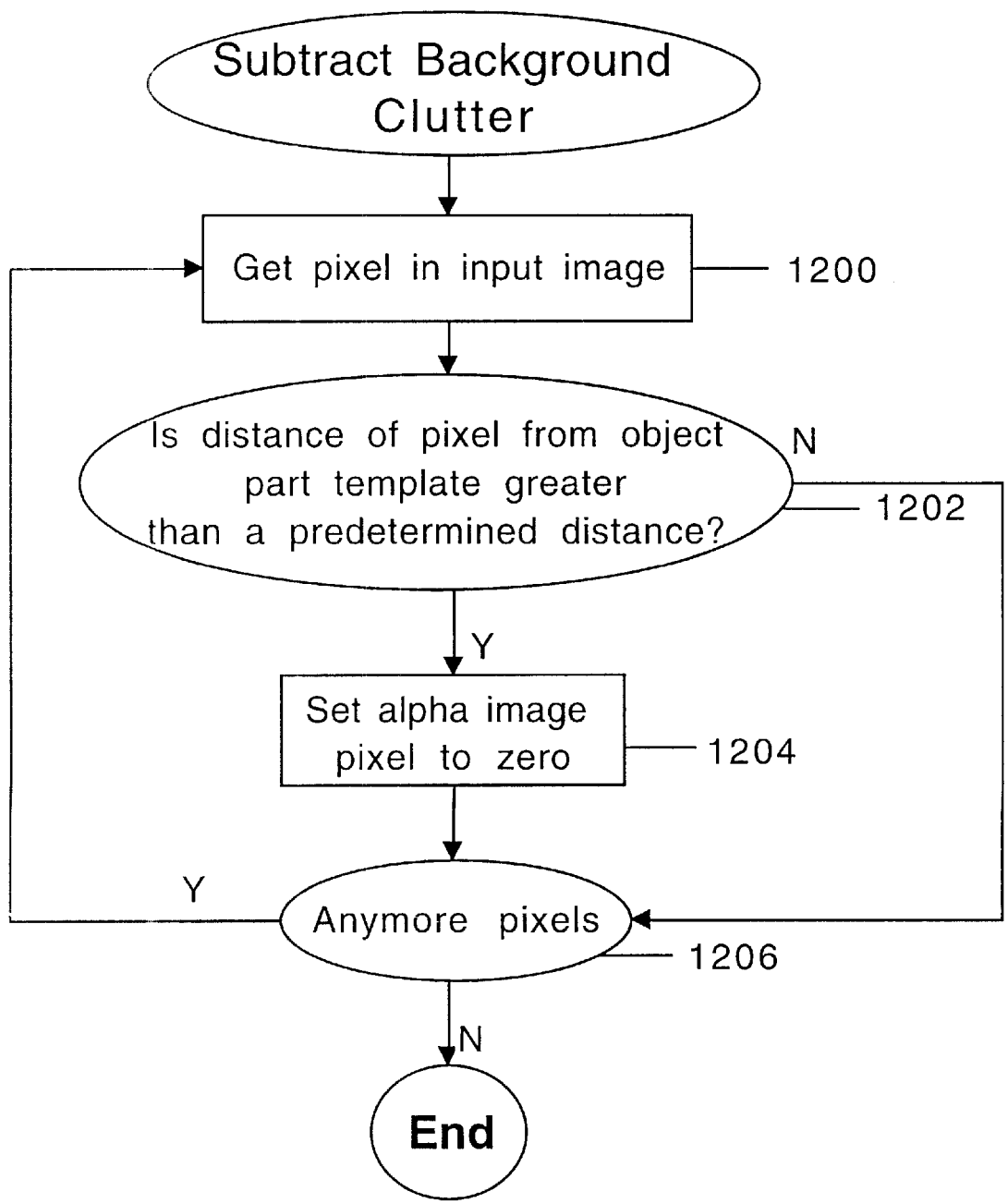
FIG. 12A is a flowchart showing a process for eliminating background artifacts and clutter close to the boundary of the object so that such items are not unintentionally composited with the object onto the destination image.

FIG. 12A is a flowchart of a process for eliminating background artifacts and clutter close to the boundary of the object so that such items are not unintentionally composited with the object onto the destination image. The system first retrieves a pixel from the input image in block 1200. At 1202 the system determines whether the pixel is greater than a predetermined distance from the closest object part template. If the pixel is farther than a predetermined distance from the template, the system will not consider that pixel as potentially part of the object and will ensure that it is not composited along with the object by setting its corresponding pixel in the alpha image to zero as shown in block 1204.

If the pixel is not greater than a predetermined distance the system does nothing to the pixel's corresponding alpha image pixel and simply checks for any remaining pixels in the input image as shown in block 1206. If there are any remaining pixels the system returns to 1200 and repeats the process. If there are no more pixels, the background clutter subtraction process is complete.

Figure 12B:
FIG. 12B shows an alpha image of the object after the shadow reduction, hole filling, and background clutter procedures have been performed.

At this stage the alpha image has been completed. FIG. 12B shows the alpha image after the shadow filtering, hole filling, and background clutter subtraction have been performed. As the image in FIG. 12B shows, the alpha image is significantly improved. Along with an alpha image being formed, a summed area table is created. This table contains a slot or position for each pixel in the alpha image. Each slot contains the total or summed number of alpha pixels that have a value of "1." The slots for each pixel begin at the top left corner of the alpha image and proceed from left to right until it reaches the bottom right corner of the alpha image. Thus, each pixel has one slot that has a value representing the total number of "1's" up to that point.

Figure 13:
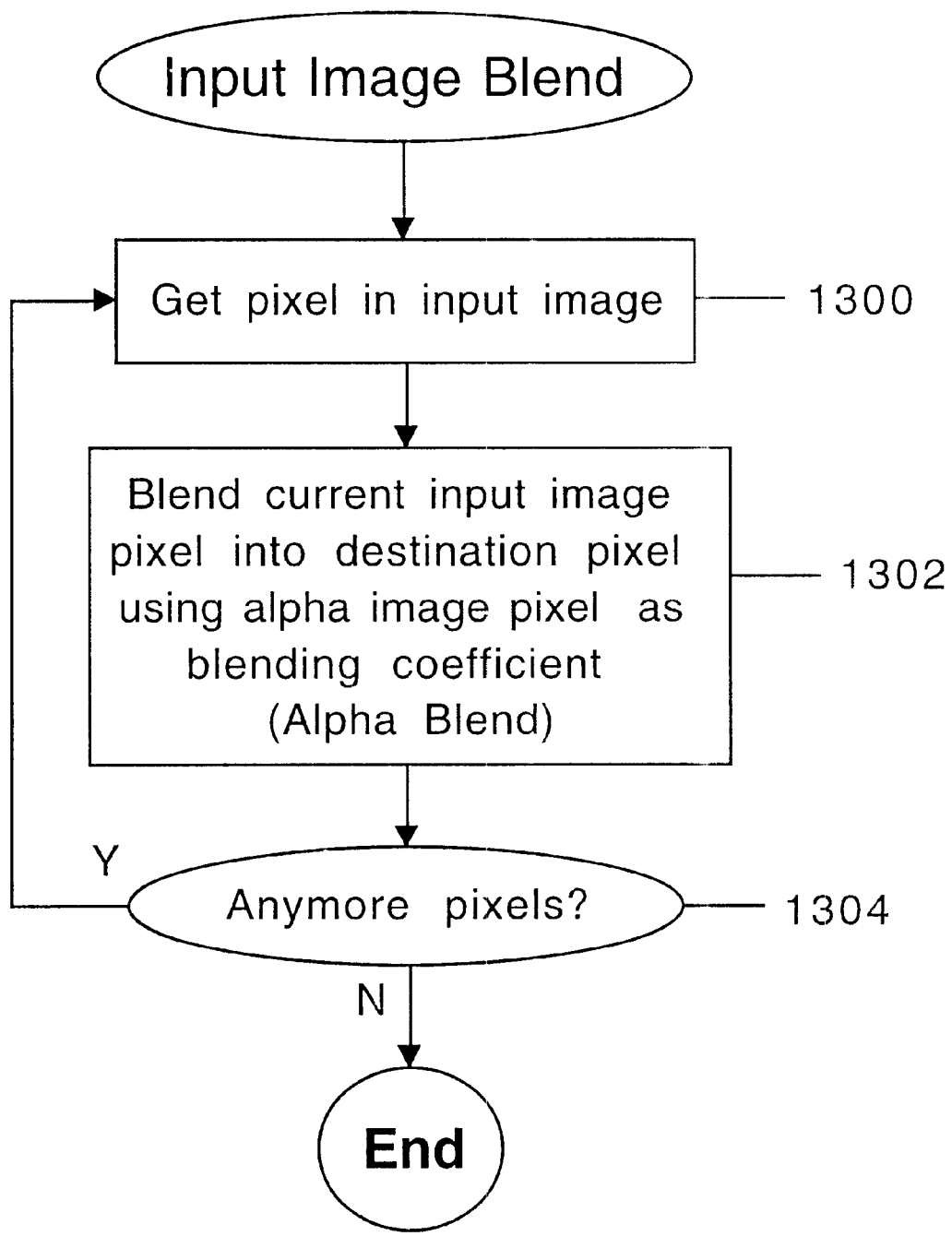
FIG. 13 is a flowchart showing a process for blending the object from the input image onto the destination image using the alpha image as a blending coefficient.

The final procedure in the described embodiment of the model-based compositing method is known in the art as an alpha blend. FIG. 13 is a flowchart of a process for blending the object from the input image onto the destination image using the alpha image as a blending coefficient. At 1300 the system begins the final process by retrieving a pixel from the input image and sets it to the current input image pixel. At 1302 the system performs the alpha blend. The system examines the alpha image pixel corresponding to the current input image pixel. If the alpha image pixel is one, the current input image pixel is composited onto a destination image. If the alpha image pixel value is zero, the current pixel is not composited. At 1304 the system checks for remaining pixels in the input image. If there are remaining pixels, control returns to 1300 where the next pixel is retrieved and set to the current input image pixel. If there are no more pixels, the alpha blending process and the overall compositing process is complete. In another preferred embodiment, the completed alpha image can be used to transform the object before the object is composited onto the destination image. The alpha pixels can be manipulated to create special effects on the object, such as making the object black and white (if originally in color) or making the object transparent, before blending the object onto the destination image. The object can also be taken out of the input image and the remaining average image can be blended onto a destination image. One preferred way of doing this is to simply reverse the values of the pixels in the alpha image before using the image in an alpha blend.

While this invention has been described in terms of several preferred embodiments, it is contemplated that alterations, modifications and permutations thereof will become apparent to those skilled in the art upon a reading of the specification and study of the drawings. For example, although a process using a histogram is used to create the templates for the object fill, other methods such as deformable spline templates can be used in place of histograms. In another example, while a camera can be used to capture frames of the input image to build a background model, the images can also come from a stored media, such as previously recorded images on a video tape. In another example, while a preferred embodiment of the shadow reduction process uses a rank statistic to get a measure of the pattern surrounding a current pixel, other methods such as spatial frequency analysis or correlation, may be used to determine whether a pattern surrounds the current pixel. In yet another example, while the set of templates is created using ratios and bounding rectangles, and remains the same, the templates may be created using historical data (e.g. data from previous frames) to create the templates more efficiently. This method uses the fact that properties of the templates may change over time thereby allowing templates to be created dynamically, conforming the template to the object.

Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A computer-implemented digital video object compositing method comprising:

creating a background image model by examining a plurality of frames of an input image that does not contain an object to be composited;

obtaining a frame of an input image that contains the object to be composited;

creating an alpha image according to the input image that contains the object to be composited and the background image model;

determining whether a portion of the input image that contains the object to be composited comprises a shadow, wherein the shadow is determined by assigning a color value to a pixel in the background image, assigning a brightness value to the pixel in the background image, comparing the color and brightness values assigned to a corresponding pixel in the input image that contains the object, and identifying the corresponding pixel as being in a shadow where the corresponding pixel color value is substantially unchanged and the corresponding pixel brightness value is substantially less than the brightness value of the pixel in the background image;

transferring shadow information to the alpha image;

deriving a set of templates comprising the shape of the object being composited, wherein the set of templates are derived from the alpha image;

filling gaps in the alpha image according to the set of templates; and blending the object in the input image that contains the object onto a destination image using the alpha image, thereby compositing the object onto a destination image with reduced shadows and gaps in the object.

2. A method as recited in claim 1 wherein creating a background image model further includes initializing the input image that does not contain the object.

3. A method as recited in claim 1 wherein creating a background image model further includes retrieving minimum values and maximum values of pixels in the input image that does not contain the object thereby setting a first tolerance value for pixels in the input image that does not contain the object to be the difference between the minimum values and the maximum values of the pixels.

4. A method as recited in claim 1 wherein creating a background image model further includes creating a pixel value chart containing minimum values and maximum values of pixels in the background image model.

5. A method as recited in claim 4 further including updating the minimum and maximum pixel values in the pixel value chart through a process having:

determining a corresponding pixel in the input image that contains the object;

assigning a current color value of the corresponding pixel;

comparing the current color value of the corresponding pixel to the maximum color value of the pixel in the chart;

updating the maximum color value of the pixel in the chart to the current color value of the corresponding pixel, if the current color value of the corresponding pixel is greater than the maximum color value of the pixel in the chart;

comparing the current color value of the corresponding pixel to the minimum color value of the pixel in the chart; and updating the minimum color value of the pixel in the chart to the current color value of the corresponding pixel, if the current color value of the corresponding pixel is less than the minimum color value of the pixel in the chart.

6. A method as recited in claim 1 wherein creating an alpha image further includes initializing the alpha image.

7. A method as recited in claim 1 wherein creating an alpha image further includes determining whether the absolute value of differences between values corresponding to pixels in the input image that contains the object and values corresponding to pixels in the input image that does not contain the object is greater than predetermined tolerances of pixels in the input image that contains the object.

8. A method as recited in claim 1 wherein transferring shadow information to the alpha image further includes determining similarities between the input image that contains the object and the input image that does not contain the object and adjusting the alpha image accordingly.

9. A method as recited in claim 1 wherein blending the object onto the destination image further includes determining whether portions of the alpha image are set to values greater than zero.

10. A method as recited in claim 1 wherein deriving a set of templates further includes using default templates and altering the default templates based on historical data.

11. A method as recited in claim 1 further comprising transforming the alpha image before compositing the object onto the destination image.

12. A method as recited in claim 1 further including comparing the brightness of the input image that contains the object with the brightness of the input image that does not contain the object.

13. A method as recited in claim 1 further including determining whether the hue of the input image that contains the object is within a predetermined hue tolerance of the input image that does not contain the object.

14. A computer program embodied on a computer-readable medium that composites video objects, comprising:

a code segment that creates a background image model by examining a plurality of frames of an input image that does not contain an object to be composited;

a code segment that obtains a frame of an input image that contains the object to be composited;

a code segment that creates an alpha image according to the input image that contains the object to be composited and the background image model;

a code segment that determines whether a portion of the input image that contains the object to be composited comprises a shadow, wherein the shadow is determined by assigning a color value to a pixel in the background image, assigning a brightness value to the pixel in the background image, comparing the color and brightness values assigned to a corresponding pixel in the input image that contains the object, and identifying the corresponding pixel as being in a shadow where the corresponding pixel color value is substantially unchanged and the corresponding pixel brightness value is substantially less than the brightness value of the pixel in the background image;

a code segment that transfers shadow information to the alpha image;

a code segment that derives a set of templates comprising the shape of the object being composited, wherein the set of templates are derived from the alpha image;

a code segment that fills gaps in the alpha image according to the set of templates; and a code segment that blends the object in the input image that contains the object onto a destination image using the alpha image, thereby compositing the object onto a destination image with reduced shadows and gaps in the object.

15. A computer-implemented system for digitally compositing an object onto a destination image comprising:

an image modeller for creating a background image model by examining a plurality of frames of an input image that does not contain a object to be composited;

a frame capturer for obtaining a frame of an input image that contains said object to be composited;

an image creator for creating an alpha image according to the input image that contains the object to be composited and the background image model;

a shadow detector for determining whether a portion of the input image that contains the object to be composited comprises a shadow, wherein the shadow is determined by assigning a color value to a pixel in the background image, assigning a brightness value to the pixel in the background image, comparing the color and brightness values assigned to a corresponding pixel in the input image that contains the object, and identifying the corresponding pixel as being in a shadow where the corresponding pixel color value is substantially unchanged and the corresponding pixel brightness value is substantially less than the brightness value of the pixel in the background image;

a template configurator for deriving a set of templates comprising the shape of the object being composited, wherein the set of templates are derived from the alpha image;

an image modifier for transferring shadow information to the alpha image and filling gaps in the alpha image according to the set of templates; and an image blender for blending the object in the input image that contains the object onto a destination image using the alpha image, thereby compositing the object onto said destination image with reduced shadows and gaps in the object.

16. A system as recited in claim 15 wherein the image modeller further comprises an image initializer for initializing the input image that does not contain the object.

17. A system as recited in claim 15 wherein the image modeller further comprises a pixel manipulator for retrieving minimum values and maximum values of pixels in the input image that does not contain the object thereby setting a first tolerance value for pixels in the input image that does not contain the object to be the difference between the minimum values and the maximum values of the pixels.

18. A system as recited in claim 15 wherein the image modeller further comprises a pixel value configurator for creating a pixel value chart containing minimum values and maximum values of pixels in the background image model.

19. A system as recited in claim 18 further comprising a pixel value updater configured to update the minimum and maximum pixel values in the pixel value chart through a process having:

determining a corresponding pixel in the input image that contains the object;

assigning a current color value of the corresponding pixel;

comparing the current color value of the corresponding pixel to the maximum color value of the pixel in the chart;

updating the maximum color value of the pixel in the chart to the current color value of the corresponding pixel, if the current color value of the corresponding pixel is greater that the maximum color value of the pixel in the chart;

comparing the current color value of the corresponding pixel to the minimum color value of the pixel in the chart; and updating the minimum color value of the pixel in the chart to the current color value of the corresponding pixel, if the current color value of the corresponding pixel is less than the minimum color value of the pixel in the chart.

20. A system as recited in claim 15 wherein the image creator further comprises an image initializer for initializing the alpha image.

21. A system as recited in claim 15 wherein the image creator further comprises a pixel evaluator for determining whether the absolute value of differences between values corresponding to pixels in the input image that contains the object and values corresponding to pixels in the input image that does not contain the object is greater than predetermined tolerances of pixels in the input image that contains the object.

22. A system as recited in claim 15 wherein the image modifier further comprises an image comparator for determining similarities between the input image that contains the object and the input image that does not contain the object and adjusting the alpha image accordingly.

23. A system as recited in claim 15 wherein the image blender further comprises an alpha image evaluator for determining whether portions of the alpha image are set to values greater than zero.

24. A system as recited in claim 15 wherein the template configurator further comprises a default template creator for creating default templates and altering the default templates based on historical data.

25. A system as recited in claim 15 further comprising an image transformer for transforming the alpha image before compositing the object onto the destination image.

26. A system as recited in claim 15 further comprising an image brightness comparator for comparing the brightness of the input image that contains the object with the brightness of the input image that does not contain the object.

27. A system as recited in claim 15 further comprising an image hue comparator for determining whether the hue of the input image that contains the object is within a predetermined hue tolerance of the input image that does not contain the object.

28. A computer-implemented system for digitally compositing an object onto a destination image, the system comprising:

means for creating a background image model by examning a plurality of frames of an input image that does not contain the object to be composited;

means for inserting the object into said input image that does not contain the object to be composited;

means for obtaining a frame of said input image that contains said object to be composited;

means for creating an alpha image according to the input image that contains the object to be composited and the background image model;

means for determining whether a portion of the input image that contains the object to be composited comprises a shadow, wherein the shadow is determined by assigning a color value to a pixel in the background image, assigning a brightness value to the pixel in the background image, comparing the color and brightness values assigned to a corresponding pixel in the input image that contains the object, and identifying the corresponding pixel as being in a shadow where the corresponding pixel color value is substantially unchanged and the corresponding pixel brightness value is substantially less than the brightness value of the pixel in the background image;

means for transferring shadow information to sad alpha image;

means for deriving a set of templates comprising the shape of the object being composited, wherein the set of templates are derived from the alpha image;

means for filling gaps in said alpha image according to the set of templates; and means for blending be object in the input image that contains the object onto a destination image using said alpha image, thereby compositing said object onto said destination image with reduced shadows and gaps in said object.

29. A system as recited in claim 28 wherein means for creating a background image model further comprises means for initializing the input image that does not contain the object.

30. A system as recited in claim 28 wherein means for creating a background image model further comprises means for retrieving minimum values and maximum values for pixels in the input image that does not contain the object thereby setting a first tolerance value for pixels in the input image that does not contain the object to be the difference between the minimum values and the maximum values for of the pixels.

31. A system as recited in claim 28 wherein means for creating a background image model further comprises means for creating a pixel value chart containing minimum values and maximum values of pixels in the background image model.

32. A system as recited in claim 31 further comprising means for updating the minimum and maximum pixel values in the pixel value chart through a process having:

determining a corresponding pixel in the input image that contains the object;

assigning a current color value of the corresponding pixel;

comparing the current color value of the corresponding pixel to the maximum color value of the pixel in the chart;

updating the maximum color value of the pixel in the chart tot the current color value of the corresponding pixel, if the current color value of the corresponding pixel is greater than the maximum color value of the pixel in the chart;

comparing the current color value of the corresponding pixel to the maximum color value of the pixel in the chart; and updating the minimum color value of the pixel in the chart to the current color value of the corresponding pixel, if tie current color value of the corresponding pixel is less than the minimum color value of the pixel in the chart.

33. A system as recited in claim 28 wherein means for creating an alpha image further comprises means for initializing the alpha image.

34. A system as recited in claim 28 wherein means for creating an alpha image further comprises means for determining whether the absolute value of differences between values corresponding to pixels in the input image that contains the object and values corresponding to pixels in the input image that does not contain the object is greater than predetermined tolerances of pixels in the input image that contains the object.

35. A system as recited in claim 28 wherein the means for transferring shadow information to said alpha image further comprises means for determining similarities between the input image that contains the object and the input image that does not contain the object and adjusting the alpha image accordingly.

36. A system as recited in claim 28 wherein means for blending the object onto the destination image further comprises means for determining whether portions of the alpha image are set to values greater than zero.

37. A system as recited in claim 28 wherein means for deriving a set of templates further comprises means for using default templates and altering the default templates based on historical data.

38. A system as recited in claim 28 further comprising means for transforming the alpha image before compositing the object onto the destination image.

39. A system as recited in claim 28 further comprising means for comparing the brightness of the input image that contains the object with the brightness of the input image that does not contain the object.

40. A system as recited in claim 28 further comprising means for determining whether the hue of the input image that contains the object is within a predetermined hue tolerance of the input image that does not contain the object.

41. A computer-implemented digital video object compositing method comprising:

creating a background model by examining a plurality of frames of a background image;

obtaining a frame of an input image that contains an object to be composited;

creating an alpha image such that a value of each pixel in the alpha image is set according to a value corresponding to a pixel from the input image and a value corresponding to a pixel from the background image;

deriving a set of templates such that the set of templates comprises the shape of the object being composited, who the set of templates are derived from the alpha image;

setting the values of pixels in the alpha image according to the set of templates such that portions of the alpha image contained within the templates are adjusted so that the pixels do not represent holes in the object; and blending the object in the input image onto a destination image using the alpha image as a blending coefficient thereby compositing the object into the destination image with reduced shadows and holes in the object wherein the shadow is determined by assigning a color value to a pixel in the background image, assigning a brightness value to the pixel in the background image, comparing the color and brightness values assigned to a corresponding pixel in the input image that contains the object, and identifying the corresponding pixel as being in a shadow where the corresponding pixel color value is substantially unchanged and the corresponding pixel brightness value is substantially less than the brightness value of the pixel in the background image.

42. An object compositing method of extracting an object from an image and blending the object onto a destination image, the method comprising:

creating a background model by examining a plurality of frames of a background image;

obtaining a frame of an input image that contains an object to be composited;

creating an alpha image such that a value of each pixel in the alpha image is set according to a difference between a corresponding value of a pixel from the input image and a corresponding value of a pixel from the background image;

comparing a brightness value of each pixel in the input image with a brightness value of each corresponding pixel in the background image;

determining whether the hue of the pixel from the input image is within a predetermined hue tolerance of a corresponding pixel from the background image;

calculating a first rank statistic of the pixel from the input image relative to an adjacent pixel from the input image and comparing the first rank statistic with a calculated second rank statistic of the corresponding pixel from the background image to the adjacent pixel from the background image, thereby determining whether the pixel from the input image is part of a shadow; and blending the object in the input image onto the destination image using the alpha image as a blending coefficient thereby compositing the object into the destination image with minimum shadows and gaps in the object.

* * * * *